United States Patent
Hashimoto et al.

(10) Patent No.: US 6,459,467 B1
(45) Date of Patent: *Oct. 1, 2002

(54) LIQUID CRYSTAL LIGHT MODULATING DEVICE, AND A MANUFACTURING METHOD AND A MANUFACTURING APPARATUS THEREOF

(75) Inventors: Kiyofumi Hashimoto, Suita (JP); Masakazu Okada, Kyoto (JP); Kenji Nishiguchi, Ikoma (JP); Tatsuo Taniguchi, Hashimoto (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,127

(22) Filed: May 10, 1999

(30) Foreign Application Priority Data

May 15, 1998 (JP) .......................... 10-133520
Nov. 11, 1998 (JP) .......................... 10-320958

(51) Int. Cl.⁷ ................................. G02F 1/1339
(52) U.S. Cl. ......................... 349/153; 349/190
(58) Field of Search ................ 349/153, 189, 349/190, 155

(56) References Cited

U.S. PATENT DOCUMENTS

| | | | |
|---|---|---|---|
| 5,399,390 A | 3/1995 | Akins ............................ 428/1 |
| 5,593,615 A | 1/1997 | Nerad et al. ............. 252/299.01 |
| 5,929,961 A | 7/1999 | Nishi et al. ................. 349/187 |
| 5,943,113 A | 8/1999 | Ichihashi ..................... 349/187 |
| 5,978,065 A | * 11/1999 | Kawasumi et al. ......... 349/188 |
| 6,011,609 A | * 1/2000 | Kato et al. .................. 349/190 |
| 6,013,339 A | * 1/2000 | Yamada et al. ............. 349/153 |

FOREIGN PATENT DOCUMENTS

| | | |
|---|---|---|
| GB | 2 049 973 | 12/1980 |
| JP | 61-190313 | 8/1986 |
| JP | 62-203123 | 9/1987 |
| JP | 62 267720 | 11/1987 |
| JP | 62 267721 | 11/1987 |
| JP | 05-005890 | 1/1993 |
| JP | 05-005892 | 1/1993 |
| JP | 05-005893 | 1/1993 |
| JP | 07 020479 | 1/1995 |
| JP | 08-106101 A | 4/1996 |
| JP | 08-171093 | 7/1996 |
| JP | 09-061829 A | 3/1997 |
| JP | 09-127528 | 6/1997 |
| JP | 09-211437 | 8/1997 |
| JP | 10-221700 A | 8/1998 |
| WO | WO 85/02915 | 7/1985 |

* cited by examiner

*Primary Examiner*—Toan Ton
(74) *Attorney, Agent, or Firm*—Sidley Austin Brown & Wood

(57) ABSTRACT

A liquid crystal display device which has a liquid crystal composition between a first substrate and a flexible second substrate. The liquid crystal composition is filled between the substrates by being dispensed on the first substrate and spread uniformly while the second substrate is being pressed against the first substrate by a roller, and the liquid crystal composition is sealed by sealing resin provided on the sides of the substrates. The gap between the substrates is maintained by spherical spacers and/or a resin structure.

32 Claims, 16 Drawing Sheets

FIG. 2
FIG. 2a
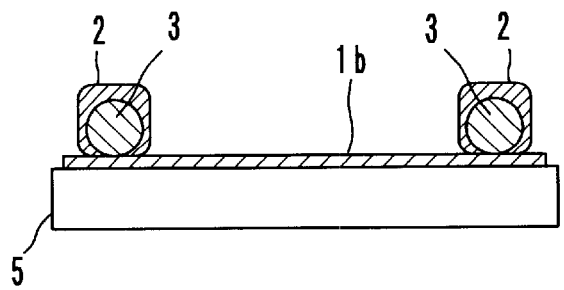
FIG. 2b
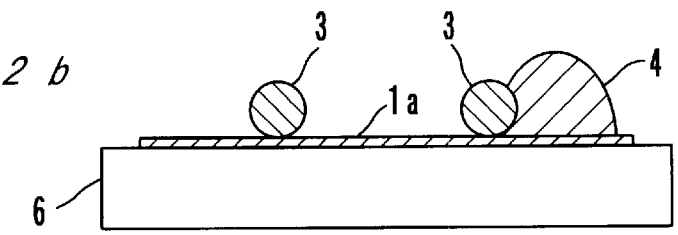
FIG. 2c
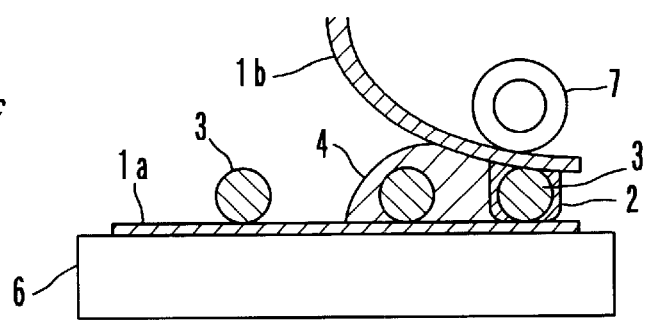
FIG. 2d
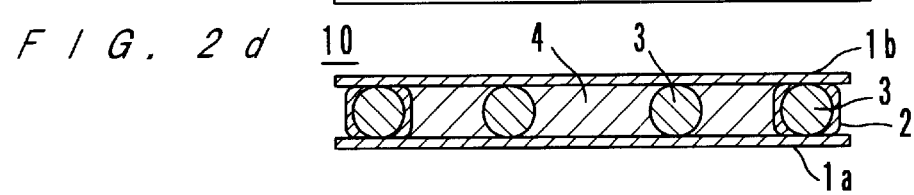
FIG. 2e
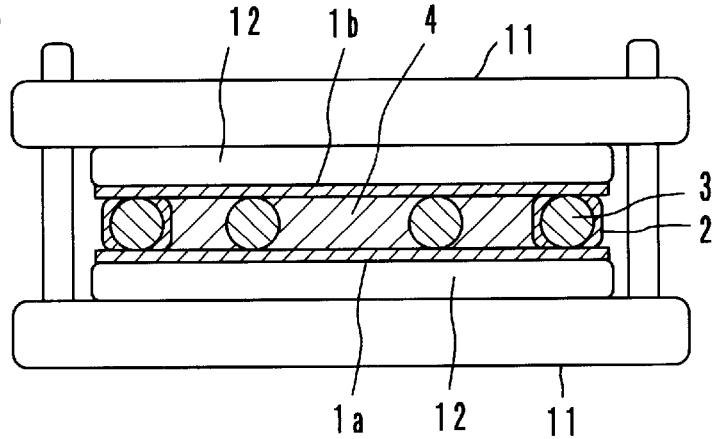

FIG. 5

F I G. 6
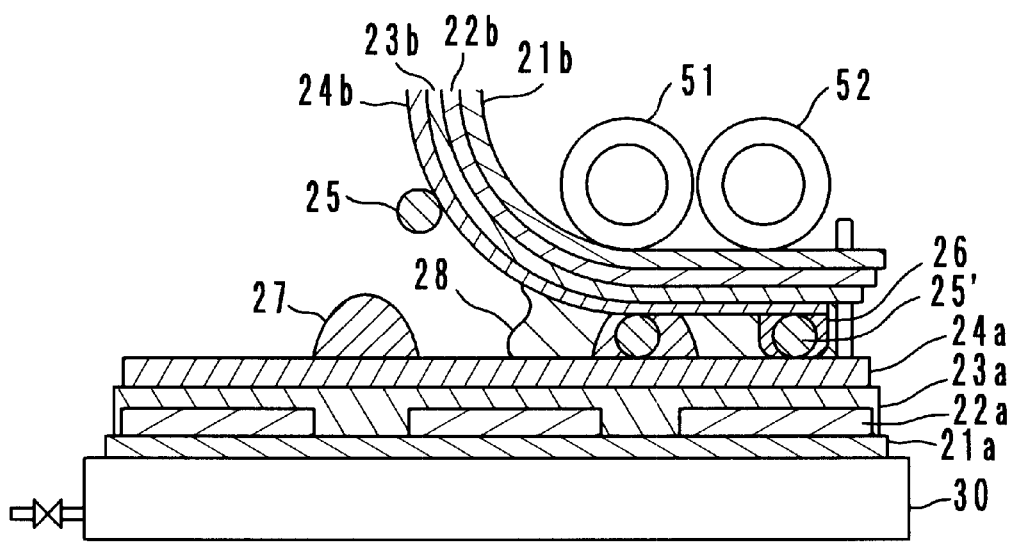
F I G. 7
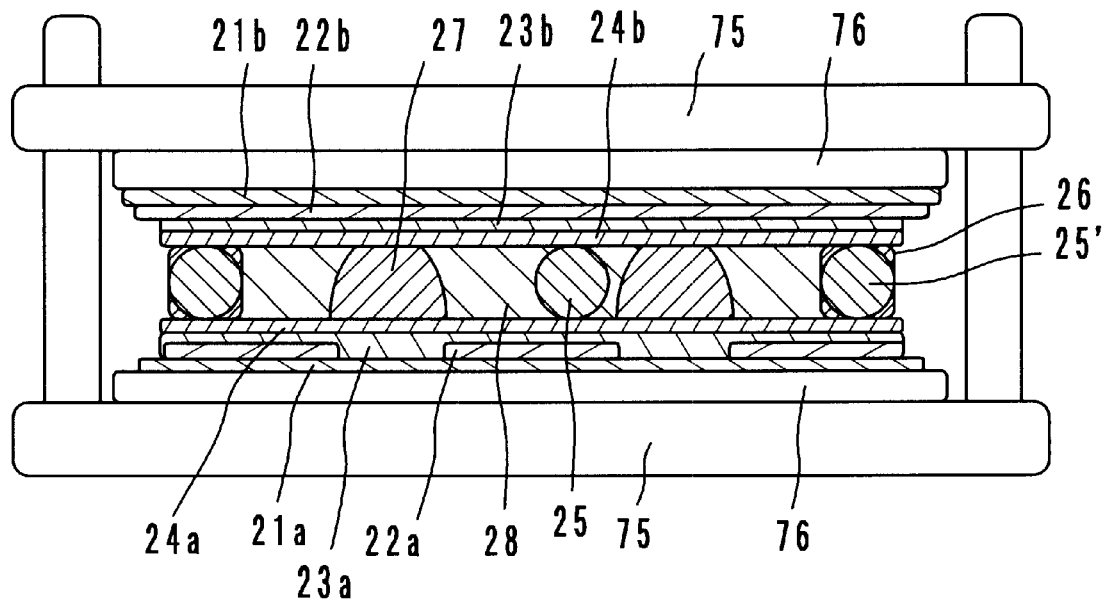

FIG. 9
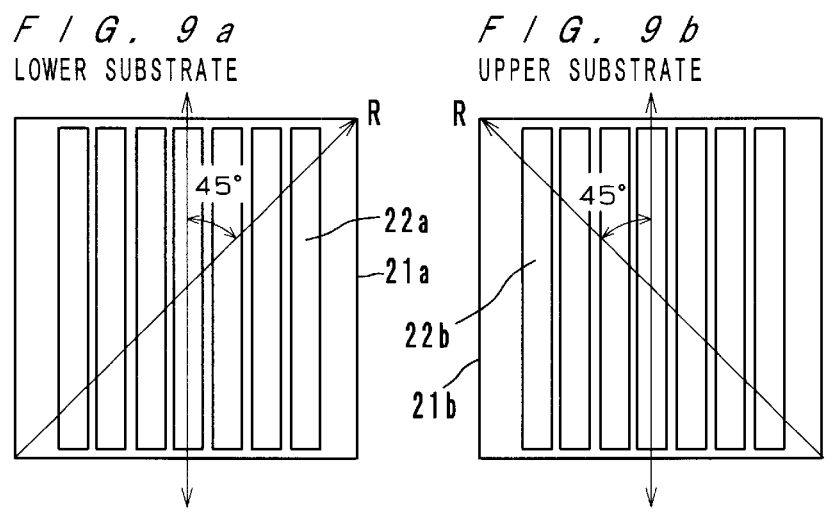
FIG. 9a
LOWER SUBSTRATE
FIG. 9b
UPPER SUBSTRATE
FIG. 10
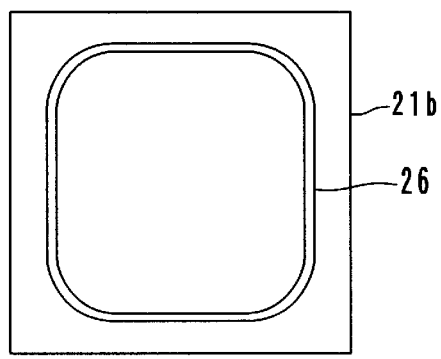
FIG. 11
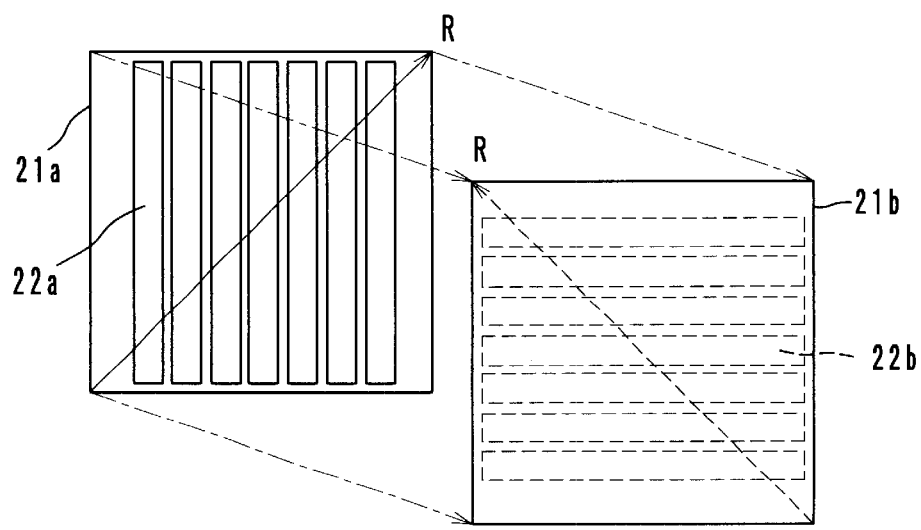

F I G. 1 8
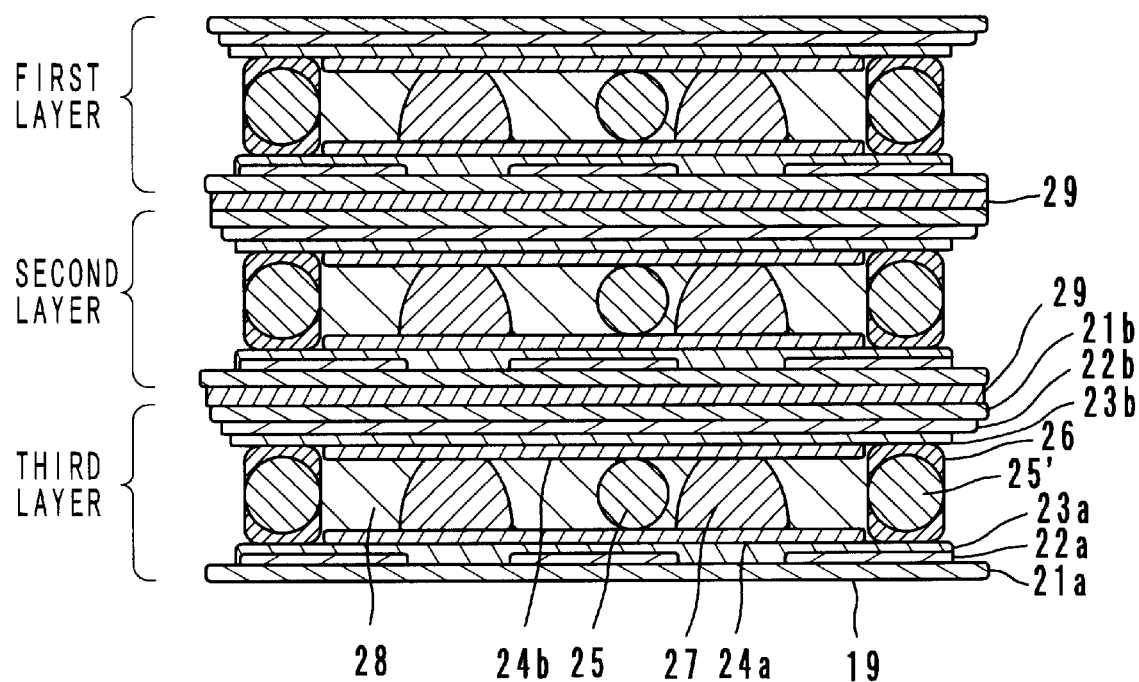

FIG. 19
FIG. 19a
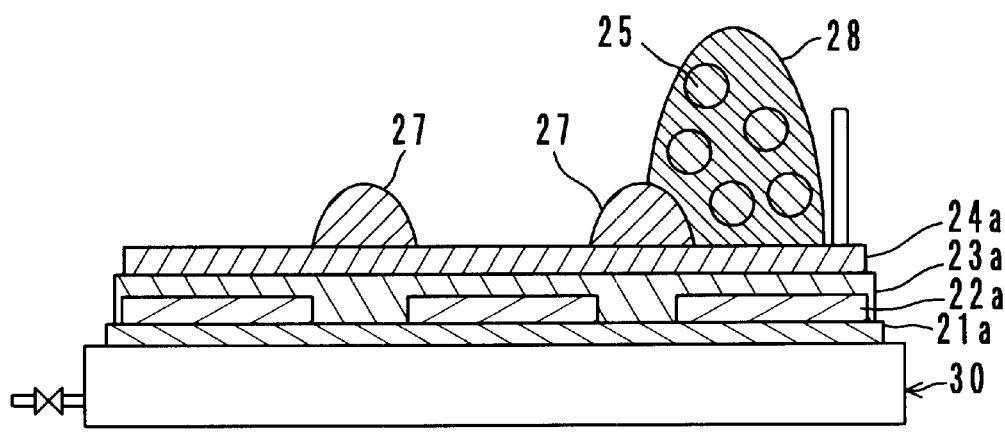
FIG. 19b
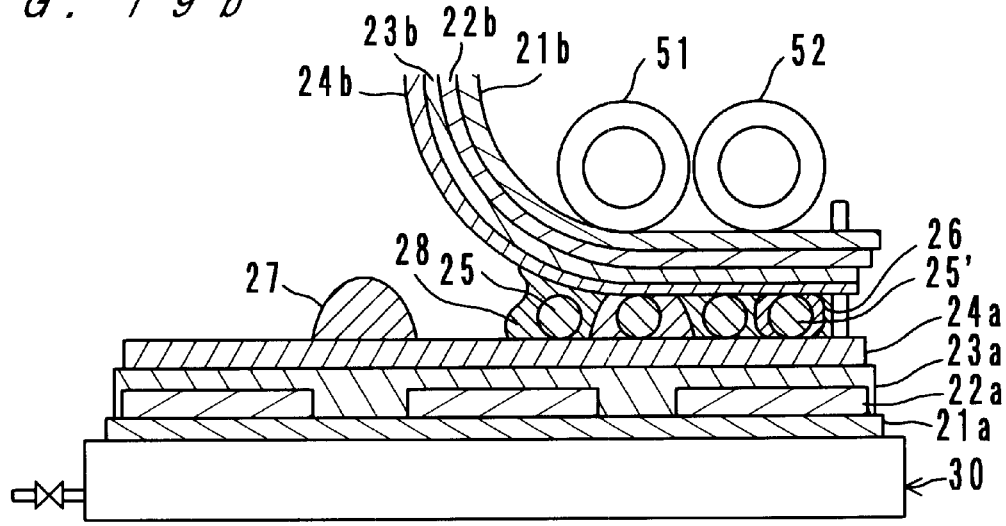

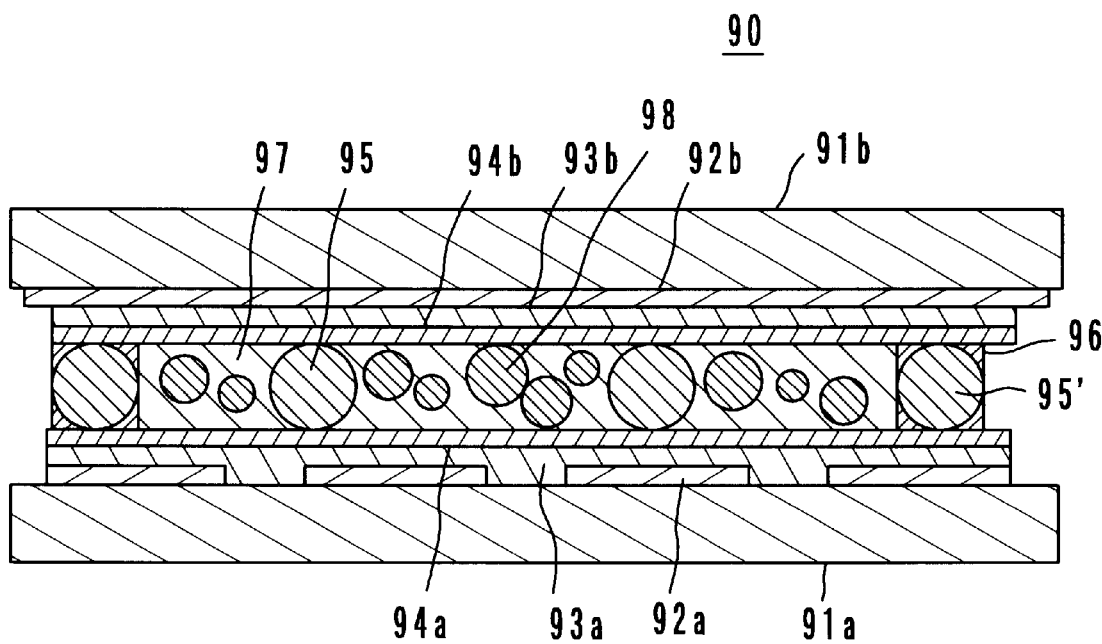
F I G. 20

LIQUID CRYSTAL LIGHT MODULATING DEVICE, AND A MANUFACTURING METHOD AND A MANUFACTURING APPARATUS THEREOF

This application is based on application Nos. 10-133520 and 10-320958 filed in Japan, the contents of which are hereby incorporated by reference.

BACKGROUND OF THE INVENTION

1. Field of the Invention

The present invention relates to a liquid crystal light modulating device, and more particularly to a liquid crystal light modulating device wherein at least one of two substrates is flexible. The present invention also relates to a method and an apparatus of such a liquid crystal light modulating device.

2. Description of Related Art

Recently, a display device which uses a liquid crystal composition is used as not only a display section of a note type personal computer but also display sections of other various display media. Such a liquid crystal display device has an advantage of contributing to energy saving and thinning of an apparatus. Therefore, liquid crystal display devices of a medium size and a small size have been employed in portable equipment. In these days, however, liquid crystal display devices are being developed to be used as large size displays which are substitutes for CRTs and displays of wall type TVs.

As a method of manufacturing a liquid crystal display device, conventionally, a vacuum injection method has been adopted. In this method, on one of a pair of glass substrates, which have electrodes thereon, sealing resin is provided at the sides while making an opening through which a liquid crystal composition is to be injected. On the other substrate, spacers are dispersed so that a specified gap can be maintained between the two substrates. Thereafter, the substrates are laminated and heated, whereby the sealing resin is hardened. Thus, a panel is fabricated. This panel is disposed in a decompressed bath, and the inside of the panel is evacuated. In this state, the opening is made contact with a liquid crystal composition. Then, by returning the bath into the atmospheric pressure, the liquid crystal composition is injected into the panel.

According to the vacuum injection method, however, as the display area is increasing, a larger injecting device and a longer injecting time are required. Therefore, another efficient method of injecting and sealing a liquid crystal composition in a panel was demanded.

Measures to solve this problem have been suggested in Japanese Patent Laid Open Publication Nos. 61-190313, 5-5890, 5-5892, 5-5893, 8-171093, 9-127528, 9-211437. According to the methods disclosed by these publications, a liquid crystal display device is fabricated as follows: first, sealing resin is formed on a substrate, and a liquid crystal composition is dropped on the substrate; next, another substrate is pressed against the substrate in such a way to have a specified gap between the substrates; then, the sealing resin is hardened. According to these methods, vacuum injection is not necessary.

These methods, however, have problems. In the method disclosed by Publication No. 61-190313, when the gap between the substrates becomes even while the substrates are pressed, the sealing resin is hardened. The substrates are likely to be displaced from each other while being pressed because the liquid crystal composition which was dropped inside the sealing resin is fluid and because the sealing resin has not been hardened. Also, while the sealing resin is being hardened thereafter, the substrates may be displaced further. Thus, in this method, there are still problems different from those in the vacuum injection method.

In either of the methods disclosed by Publication Nos. 5-5890, 5-5892 and 5-5893, a liquid crystal composition is dispensed onto a substrate with unhardened sealing resin. Thereafter, another substrate is laid and pressed on this substrate, and the sealing resin is hardened. Thus, because the sealing resin has not been hardened when the liquid crystal composition is dispensed onto the substrate, the above-described problems are likely to occur. In the methods disclosed by Publication Nos. 5-5892 and 5-5893, the substrates or the sealing resin has a portion through which an excess of the liquid crystal composition will be discharged outward when the two substrates are laminated. As mentioned, thereafter, the sealing resin is hardened. After the sealing resin is hardened, there is still the discharging portion. Therefore, when the pressure applied to the substrates is reduced after the lamination of the substrate, the substrates expand, and the gap between the substrates cannot be adjusted exactly to the designed one. Thus, in these methods, there is still a problem different from the problems in the vacuum injection method.

In the method disclosed by Publication No. 8-171093, photosetting resin is used as the sealing resin, and before the sealing resin is hardened, two substrates are laminated. Therefore, in this method, there are still the above-described problems caused by applying pressure between unhardened sealing resin and a liquid crystal composition. Further, according to this method, after the gap between the substrates was adjusted, ultraviolet rays are radiated in vacuum. At this time, it is necessary to press at least the substrate which is directly exposed to the ultraviolet ray radiation uniformly with a plate which transmits ultraviolet rays. The surface of the plate must be sufficiently flat. It is, however, difficult to produce such a plate when the substrates are large.

In the method disclosed by Publication No. 9-127528, thermoplastic photosetting resin which has a softening point within a range from a room temperature to the N-I point of the liquid crystal composition is used as the sealing resin. Generally, the N-I point of a liquid crystal composition is at most around 100° C., and a material which has a softening point less than 100° C. is used as the sealing resin. In this case, the sealing resin may softened when it is exposed to heat radiated from a back light or when it is used in a closed room or a car. If the sealing resin becomes soft, the resin may fuse into the liquid crystal composition and may form a thin film on the interfaces between the liquid crystal composition and the substrates, thereby lowering the reliability of the display and making the liquid crystal out of alignment.

In the method disclosed by Publication No. 9-211437, a liquid crystal composition is dispensed on a substrate, and another substrate is laid thereon while being bent. Thereafter, ultraviolet rays are radiated. Thus, in-polymer dispersed liquid crystal is made. Prior to the lamination of the substrates, a seal with an opening is provided to one of the substrates, and after the substrates are laminated, the seal is exposed to light to be hardened. However, a step of closing the opening of the seal is necessary, thereby complicating the manufacturing process. Also, there are still the above-described problems caused by using unhardened resin, radiating ultraviolet rays after lamination of substrates.

Further, none of the above publications discloses an apparatus which is suited to mass-produce liquid crystal light modulating devices.

SUMMARY OF THE INVENTION

An object of the present invention is to provide an improved liquid crystal light modulating device, and a manufacturing method and a manufacturing apparatus thereof.

Another object of the present invention is to provide a method and an apparatus which are suited to mass-produce liquid crystal light modulating devices.

In order to attain the objects, a light modulating device according to the present invention comprises: a first substrate and a second substrate, at least one of which is flexible; a liquid crystal material filled between the first and second substrates; and a seal surrounding the liquid crystal material to prevent the liquid crystal material from leaking. The liquid crystal modulating device is manufactured by executing the steps of: (a) providing the seal on at least one of the first and second substrate, the seal being incompletely hardened; (b) dispensing the liquid crystal material on the first substrate; and (c) placing, after the execution of the steps (a) and (b), the second substrate on the first substrate and hardening the seal to join the first and second substrates together.

An apparatus for manufacturing the liquid crystal modulating device comprises: a support which supports the first substrate; a dispenser which dispenses the liquid crystal material on the first substrate; a presser, which in cooperation with the support, presses the second substrate against the first substrate; and a mechanism which relatively moves the presser against the support. By using this apparatus, the liquid crystal modulating device is manufactured by executing the steps of: (a) placing the first substrate on the support and dispensing the liquid crystal material on the first substrate; and (b) placing, after the execution of the step (a), the second substrate on the first substrate and pressing the first substrate against the second substrate by relatively moving the presser against the support.

BRIEF DESCRIPTION OF THE DRAWINGS

These and other objects and features of the present invention will be apparent from the description with reference to the accompanying drawings, in which:

FIG. 2 is composed of FIGS. 2a through 2e which show a manufacturing process of the liquid crystal light modulating device of the first embodiment;

FIG. 6 is an illustration which shows a step of the manufacturing process of the liquid crystal light modulating device of the second embodiment;

FIG. 7 is an illustration which shows a step of the manufacturing process of the liquid crystal light modulating device of the second embodiment;

FIG. 9 is composed of FIGS. 9a and 9b which show directions of alignment of aligning layers formed on a first substrate and a second substrate of the liquid crystal light modulating device of the second embodiment;

FIG. 10 is a plan view which shows sealing resin provided on the second substrate;

FIG. 11 is an illustration whish shows a direction of lamination of the substrates;

FIG. 18 is a third embodiment of the liquid crystal light modulating device;

FIG. 19 is composed of FIGS. 19a and 19b which shows a manufacturing prowess of the third embodiment; and FIG. 20 is a sectional view of a fourth embodiment of the liquid crystal light modulating device.

DETAILED DESCRIPTION OF THE PREFERRED EMBODIMENTS

Embodiments of a liquid crystal light modulating device, a manufacturing method and a manufacturing apparatus thereof according to the present invention are described with reference to the accompanying drawings.

First Embodiment of a Liquid Crystal Light Modulating Device; See FIGS. 1 and 2

As the first embodiment, a liquid crystal display device 10 which uses cholesteric liquid crystal as the liquid crystal composition and indicates a temperature according to the color tone, and a manufacturing method thereof are described.

Figure 1:
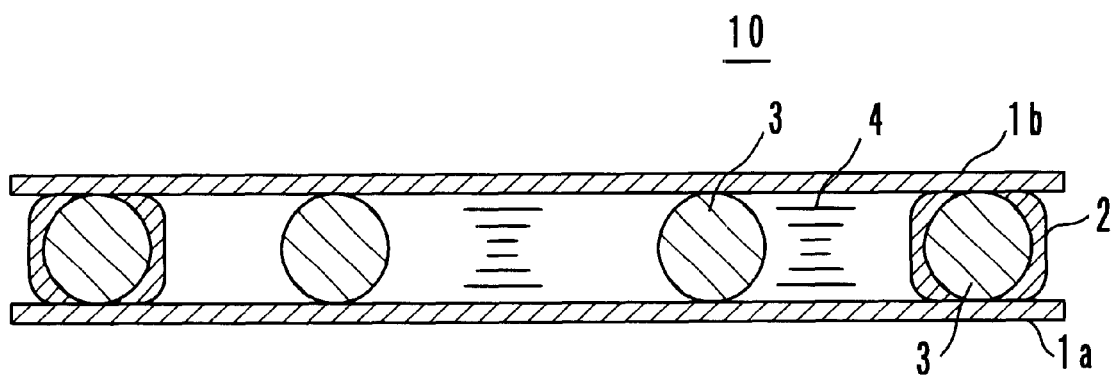
FIG. 1 is a sectional view of a first embodiment of a liquid crystal light modulating device according to the present invention.

FIG. 1 is a sectional view of the liquid crystal display device 10. Between a first substrate 1a and a second substrate 1b, which are made of a light transmitting material, a liquid crystal composition 4 which exhibits a cholesteric phase in a room temperature is filled as a light modulating layer. On the sides of the substrates 1a and 1b, sealing resin 2 containing spacers 3 is provided. Further, the spacers 3 are provided between the substrates 1a and 1b to adjust the gap between the substrates 1a and 1b.

This liquid crystal display device 10 can be fabricated as follows.

First, as FIG. 2a shows, the second substrate 1b is placed on a base 5, and sealing resin 2 in which spacers 3 were mixed beforehand is coated on the second substrate 1b at the sides. The sealing resin 2 may be anything as long as it can seal the liquid crystal composition inside the display device; it is, however, preferred that ultraviolet ray setting resin, thermosetting resin or the like is used as the sealing resin 2.

Especially if thermosetting resin such as epoxy resin is used as the sealing resin 2, high sealing performance can be maintained for a long time.

The following methods can be adopted to provide the sealing resin 2 on the substrate 1b: a dispenser method, ink jet method, etc. in which resin is injected on the substrate through a nozzle; a printing method using a screen, a metal mask or the like; and a transfer method in which resin is once shaped on a plate or a roller, and the shaped resin is transferred onto the substrate 1b.

The sealing resin 2 is provided on the substrate 1b, for example, in such a way to make a closed ring along the sides of the substrate 1b. As will be described later, in the first embodiment, the liquid crystal composition is dropped on at least one of the substrates, and thereafter, the substrates are joined together. Therefore, the sealing resin 2 is not required to have an opening through which the liquid crystal composition is to be injected or discharged. It, however, will cause no problem even if such an opening is made in the sealing resin 2; the opening can be closed by ultraviolet ray setting resin or the like after the liquid crystal composition is filled between the substrates. The width of the sealing resin 2 is preferably within a range from approximately 10 $\mu$m to approximately 100 $\mu$m.

The sealing resin 2 provided on the second substrate 1b is heated to come to a semi-hardened state. Here, the semi-hardened state means a state where part of the resin component is hardened, whereby the fluidity and the tack of the surface are lowered. If the sealing resin 2 contains a solvent, the semi-hardened state includes a state where the solvent is partly volatilized, whereby the fluidity and the tack of the surface are lowered. Further, the semi-hardened state is a state where the resin 2 can be deformed by pressure and is adhesive.

Meanwhile, as FIG. 2b shows, the first substrate 1a is placed on a flat plate which is capable of heating such as a hot plate 6 and is capable of vacuum sucking, and on the substrate 1a, spacers 3 are dispersed. As the spacers 3, a well-known material can be used; it is, however, preferred to use particles of a hard material which are not deformed by heat and/or pressure, for example, fine particles of glass fiber, balls of silicic acid glass, spherical particles of an inorganic material such as alumina powder, etc. and spherical particles of an organic material such as divinyl benzene crosslinked polymer, polystyrene crosslinked polymer, etc. Also, it is possible to coat these materials with resin to use as the spacers. The size of the spacers is determined according to the desired gap between the substrates, and preferably, is within a range from 1 $\mu$m to 20 $\mu$m. The dispersion of the spacers 3 can be carried out by any conventional method which may be a wet method or a dry method.

On an end of the substrate 1a on which the spacers 3 were dispersed, the liquid crystal composition 4 is dropped. At this time, for example, the liquid crystal composition 4 is injected onto the substrate 1a through a nozzle of a syringe.

Next, as FIG. 2c shows, an end of the second substrate 1b on which the sealing resin 2 was provided is laid on the end of the first substrate 1a on which the spacers 3 and the liquid crystal composition 4 were dispensed. Then, while the second substrate 1b is bent with the other end thereof lifted, the second substrate 1b is pressed against the first substrate 1a by a pressing member (for example, a silicone rubber roller 7). As the pressing member 7 is moving on the second substrate 1b, the liquid crystal composition 4 is pushed and spread, and the second substrate 1b is laid on the first substrate 1a without changing the gap between each other.

In this way, as FIG. 2d shows, a semi-finish product of the liquid crystal display device 10 is fabricated. Next, as FIG. 2e shows, this semi-finish product is sandwiched by a pair of flat plates 11, and while a load is applied, the semi-finish product is heated for a specified time. It is possible to provide elastic members 12 between the substrates 1a and 1b and the flat plate 11 so that the pressure can be applied to the substrates 1a and 1b more efficiently. When a time sufficient to completely join the substrates 1a and 1b has passed, the substrates 1a and 1b are cooled, and the flat plates 11 are removed. Thus, a liquid crystal display device 10 is finally produced. Preferably, the substrates 1a and 1b are cooled slowly while the load is applied.

The following is a specific example of the liquid crystal display device according to the first embodiment.

EXAMPLE 1

As the first substrate, 7059 glass (made by Corning Incorporated) was used, and as the second substrate, a PET film (Lumirror made by Toray Industries, Inc.) was used. An epoxy sealing agent PS0461 (made by Mitsui Chemical Co., Ltd.) with which Micropearl SP-230 (made by Sekisui Fine Chemical Co., Ltd.) with a particle diameter of 30 $\mu$m had been mixed as the spacers was printed on the second substrate by a screen printing method. Thus, sealing resin was provided on the second substrate. The second substrate with the sealing resin thereon was placed on a base 5 and was heated to 80° C. for 30 minutes, whereby the sealing resin was semi-hardened.

Next, the first substrate was placed on a hot plate 6, and the above-described Microperl SP-230 with a particle diameter of 30 $\mu$m was dispersed on the first substrate as the spacers. A liquid crystal component E44 (made by Merck & Company) containing a chiral agent CB15 (made by Merck & Company) at 40 wt % was prepared as the liquid crystal composition, and a larger volume of the liquid crystal composition than the volume of the area enclosed by the sealing resin was dropped on an end of the first substrate. The hot plate 6 was a vacuum sucking plate made of stainless, and the first substrate was fixed on the hot plate 6 by vacuum suction.

Next, an end of the second substrate was laid on the end of the first substrate where the liquid crystal composition had been dropped. While the other end of the second substrate was lifted, the second substrate was pressed by a silicone rubber roller 7 to be laid on the first substrate with a uniform gap between each other, whereby the liquid crystal composition was spread and filled between the two substrates. This was carried out in a room temperature.

Thereafter, this semi-finish product was placed between a pair of stainless flat plates 11 with polished surfaces. At this time, silicone rubber sheets 12 were inserted among the semi-finish product and the flat plates 11. Then, while a load of 0.3 kg/cm$^2$ was applied, the semi-finish product was kept in a constant temperature bath at 100° C. for 90 minutes, whereby the two substrates were joined together. Then, the electric source of the constant temperature bath was turned off, so that the semi-finish product was cooled down to a room temperature while the load was applied.

In this way, a liquid crystal display device was fabricated.

This liquid crystal display device showed blue at 10° C., showed green at 20° C. and showed red at 30° C. Thus, the color tone gradually changed according to the temperature, and the temperature could be indicated by the color tone.

Second Embodiment of a Liquid Crystal Light Modulating Device; See FIGS. 3 Through 11

As the second embodiment, a liquid crystal display device 20 which displays an image by turning on and off a multiplicity of pixels and a manufacturing process thereof are described.

Figure 3:
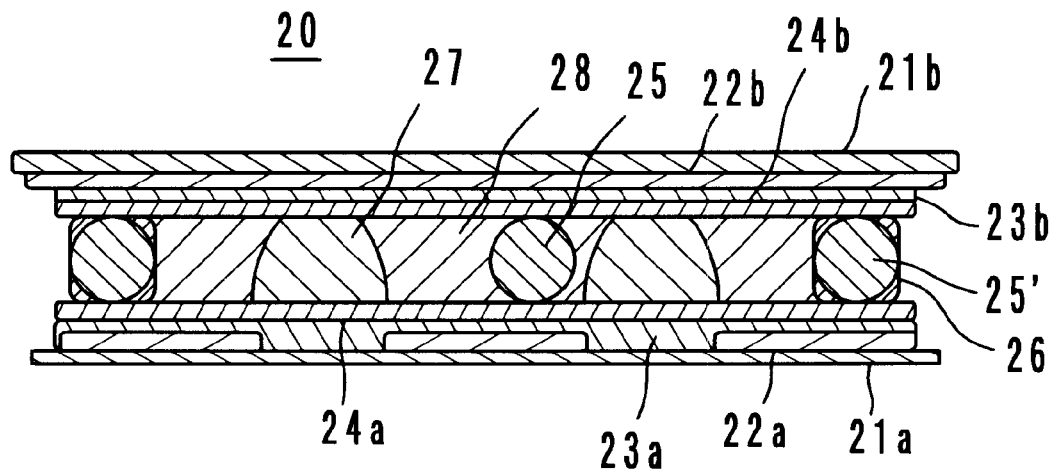
FIG. 3 is a sectional view of a second embodiment of the liquid crystal light modulating device according to the present invention.

FIG. 3 is a sectional view of the liquid crystal display device 20. Between a pair of substrates 21a and 21b, a liquid crystal composition 28 is filled as a light modulating layer. On the substrates 21a and 21b, transparent electrodes 22a and 22b, which are in the form of strips, are formed, respectively. The electrodes 22a are juxtaposed in a direction, and the electrodes 22b are juxtaposed perpendicularly to the electrodes 22a. Thus, the electrodes 22a and 22b are arranged in a matrix. On the electrodes 22a and 22b, insulating layers 23a and 23b and aligning layers 24a and 24b are formed if necessary. Further, spacers 25 are provided between the substrates 21a and 21b to adjust the gap between the substrates 21a and 21b. The substrates 21a and 21b are joined together by sealing resin 26 containing spacers 25' at the sides. In a light modulating area, a resin structure 27 is provided between the substrates 21a and 21b to support the substrates 21a and 21b.

With respect to the liquid crystal display device 20, the intersections of the electrodes 22a and 22b are pixels. The area where light modulation is carried out by the liquid crystal composition 28 is referred to as light modulating area, and the resin structure 27 is located at least in the light modulating area.

For the resin structure 27, a material which is softened as being heated and is solidified as being cooled, for example, thermoplastic resin is used. As the thermoplastic resin, for example, polyvinyl chloride resin, polyvinylidene chloride resin, polyvinyl acetate resin, polyester methacrylate resin, poly acrylic ester resin, polystyrene resin, polyamide resin, polyethylene resin, polypropylene resin, fluororesin, polyurethane resin, polyacrylonitrile resin, polyvinyl ether resin, polyviinyl ketone resin, polyether resin, polyvinyl pyrolidone resin, saturated polyester resin, etc can be named. The resin structure 27 is made of a material at least containing one of these materials or a mixture of these materials. Also, a pressure sensitive adhesive which becomes adhesive as being pressed can be used. For example, acrylic resin emulsified in water is a pressure sensitive adhesive. As an example of such acrylic resin, a water pressure sensitive adhesive Three Bond 1546 (made by Three Bond Co., Ltd.) can be named.

Further, it is possible to use ultraviolet ray setting resin. In this case, the ultraviolet ray setting resin is dispensed in specified positions on the substrates 21a and 21b by a screen printing method or the like, and before the substrates 21a and 21b are joined together, ultraviolet rays are radiated to solidify at least the surface of the resin. Either acrylic resin or epoxy resin can be used as long as it is ultraviolet ray setting, and ultraviolet ray setting type materials which are used as sealing resin in fabricating a liquid crystal panel can be used.

Figure 8:
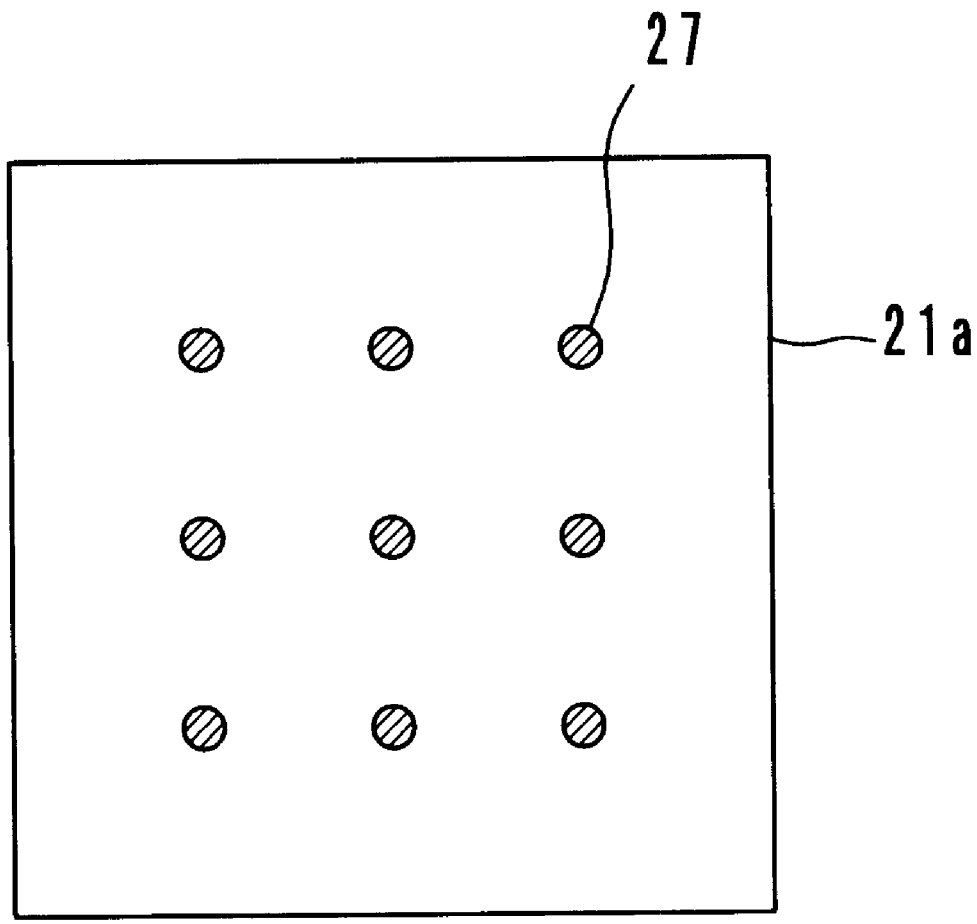
FIG. 8 is an illustration which shows arrangement of a resin structure in the liquid crystal light modulating device of the second embodiment.

The resin structure 27 has such a configuration, a size and an arrangement pattern to support the two substrates 21a and 22b properly not to intervene display performance of the liquid crystal display device. For example, the resin structure 27 is composed of dots, for example, cylinders, square poles or elliptic cylinders, which are arranged in a specified pattern such as in a latticed pattern. Also, the resin structure 27 may be composed of stripes which are arranged at specified intervals. If the resin structure 27 is a dot type, while the effective area of the light modulating area is large, the substrates 21a and 21b can be bonded firmly, resulting in a device which is strong against vibration and bend. If the resin structure 27 is a stripe type, the effective area of the light modulating area is smaller. In this case, however, the substrates 21a and 21b can be joined more firmly than in the case of providing a dot type resin structure because the adhesion area becomes larger, and the liquid crystal display device is stronger. Further, in the case of providing a stripe type resin structure, weirs are built in the liquid crystal layer, and these weirs prevent the liquid crystal composition from flowing. FIG. 8 is a plan view when the resin structure 27 is composed of cylinders arranged in a lattice.

In the case of a dot type resin structure, the maximum width of the resin dots is desirably not more than 200 $\mu$m in consideration for the adhesive property and the display characteristic. Also, the maximum width of the dots is desirably at least several micrometers, and more desirably, for the convenience in fabrication, not less than 10 $\mu$m. The size of the resin structure is an important factor to support the substrates and to have a sufficient adhesive strength. As long as the adhesion area where the resin structure adheres to the substrates is not less than 1% of the light modulating area, the liquid crystal display device will have a sufficient strength as a light modulating element. As the percentage of the resin structure in the light modulating area is increasing, the effective area of the light modulating area is decreasing; practically, as long as the percentage of the resin structure is not more than 40% of the light modulating area, the liquid crystal display device will have a sufficient characteristic as a light modulating element. With respect to a stripe type resin structure, as in the case of a dot type resin structure, the maximum width of the stripes is desirably within a range from several micrometers to 200 $\mu$m, and more desirably within a range from 10 $\mu$m to 200 $\mu$m.

Further, when a dot type resin structure is provided in a liquid crystal display device which has pixels composed of a matrix of electrode strips as in the second embodiment, in order to increase the strength of the device, it is effective to locate a plurality of resin dots in each pixel if the pixels are large, and it is effective to support a plurality of pixels with one resin dot if the pixels are small. Alternatively, if the resin dots are located among the electrodes prior to on the pixels, the effective area of the light modulating area will be larger, which is desirable. When a stripe type resin structure is provided in a liquid crystal display device which has pixels composed of a matrix of electrode strips, it is preferred to locate resin stripes along the electrode strips so as to make the effective area of the light modulating area as large as possible.

The liquid crystal composition 28 may be used in any mode, for example, in a twisted nematic (TN) mode, in a super twisted nematic (STN) mode, in a ferroelectric liquid crystal (FLC) mode, in an in plane switching (IPS) mode, in a vertical align mode (VA) mode, in an electrically induced birefringence mode, in a cholesteric-nematic phase transition guest-host mode, in an inpolymer dispersed liquid crystal mode, in a cholesteric selective reflection mode and so on.

The substrates 21a and 21b may be made of various light-transmitting materials. At least one of the substrates 21a and 21b is made of a flexible material, and the other may be made of a non-flexible material such as glass. The substrates 21a and 21b transmits light within a specified wavelength range in a visible light range. In the following paragraphs, the term "transparent" has this meaning. For a reflective type liquid crystal display device, either one of the substrates 21a and 21b is transparent, and the other is not a transparent substrate, for example, a plate, a metal plate, a plastic plate or the like which is coated with a metal layer, an organic layer, an inorganic layer or the like.

Figure 4:
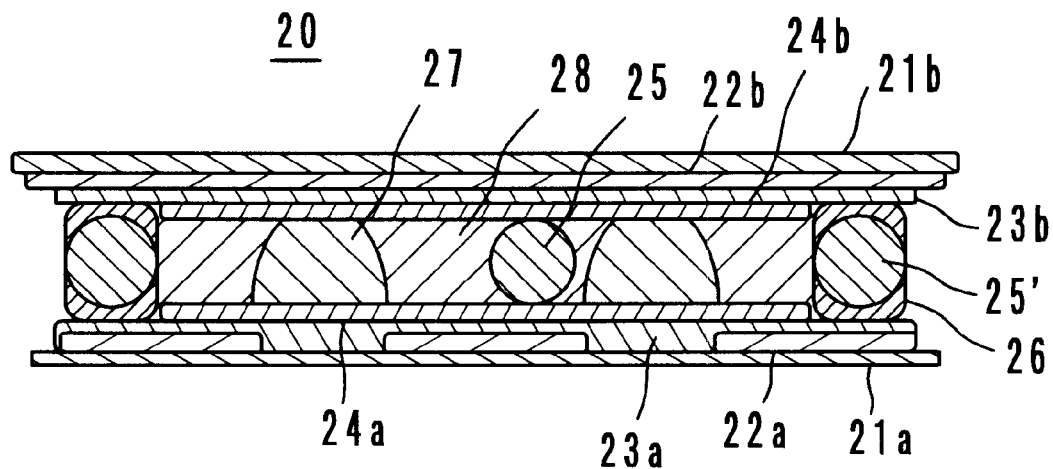
FIG. 4 is a sectional view of a modified example of the second embodiment.

FIG. 4 shows a modified example of the liquid crystal display device 20. In the case of FIG. 4, the aligning layers 24a and 24b are provided only in the light modulating area. This requires a smaller amount of material for the aligning layers 24a and 24b. Also, because the sealing resin 26 is in directly contact with the substrates 21a and 21b or the insulating layers 23a and 23b, there is no fear that atmospheric water may come into the liquid crystal layer through the aligning layers 24a and 24b.

If the sealing resin 26 is ultraviolet ray setting resin or thermosetting resin, any kind of aligning layer may prevent the sealing resin from being hardened; in a case of providing aligning layers only in the light modulating area, however, this problem can be avoided. The spacers 25' contained in the sealing resin 26 may have a size different from that of the spacers 25 dispersed in the light modulating area; if the size of the spacers 25' is equal to that of the spacers 25, however, any particular problems such as a problem that the thickness of the liquid crystal layer becomes uneven will never occur because generally, the thickness of the insulating layers and the aligning layers, the thickness of the electrodes and the thickness of the liquid crystal layer are sufficiently small compared with the horizontal dimensions of the liquid crystal display device.

Next, a manufacturing process of the liquid crystal display device 20 is described.

Figure 5A:
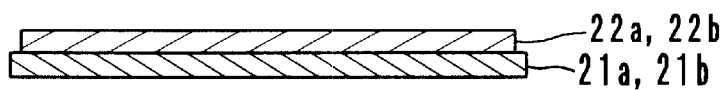
FIG. 5 is composed of FIGS. 5a through 5e and 5a' through 5c' which show a manufacturing process of the liquid crystal light modulating device of the second embodiment.
Figure 5B:
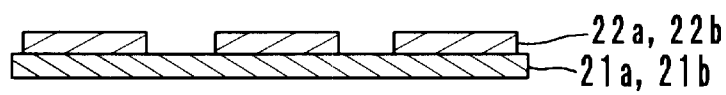

First, as FIGS. 5a and 5b show, on the substrates 21a and 21b, transparent electrodes 22a and 22b are formed in a specified pattern. It is possible to use substrates with transparent electrodes on the market such as NESA glass. At least one of the substrates 21a and 21b is flexible. In a process of laminating the substrates, which will be described later, the flexible substrate is laid on the non-flexible substrate which is kept on a flat surface.

Figure 5C:
Figure 5D:
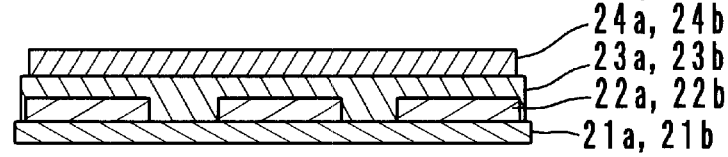

Next, as FIGS. 5c and 5d show, if necessary, organic or inorganic layers are provided on the respective surfaces of the substrates on which the electrodes were formed. In the second embodiment, first, insulating layers 23a and 23b are formed, and aligning layers 24a and 24b are formed thereon. These insulating layers and aligning layers are provided according to the necessity, and these layers may be made of an inorganic material such as silicone oxide and an organic material such as polyimide resin and may be formed by a conventional method such as a sputtering method, a spin coat method, roll coat method, etc. It is possible to provide either the insulating layers or the aligning layers. Also, these layers are possibly provided on only one of the substrates. Further, if necessary, a rubbing treatment may be carried out on the aligning layers.

Next, as FIGS. 5a' and 5b' show, the spacers 25 are dispersed on the substrate 21b, and the sealing resin 26 is coated on the substrates 21b at the sides. The sealing resin 26 is to seal the liquid crystal composition 28 in the liquid crystal display device. The sealing resin 26 as well as the resin structure 27 supports the substrates 21a and 21b, and the substrates 21a and 21b are supported by a larger area. Thereby, the gap between the substrates 21a and 21b can be maintained uniform in the whole display device.

Any material can be used as the sealing resin 26 as long as it can seal the liquid crystal composition in the liquid crystal display device; it is, however, preferred to use ultraviolet ray setting resin or thermosetting resin. Especially if thermosetting resin such as epoxy resin is used as the sealing resin 26, the display device will maintain high sealing performance for a long time. Also, the sealing resin 26 can be made of the same polymer material which is used for the resin structure 27.

The sealing resin 26 is provided on the substrate 21b in the same way as described in the first embodiment. Further, the sealing resin 26 may contain spacers 25'. The size of the spacers 25' contained in the sealing resin 26 is almost equal to the size of the spacers 25 dispersed in the light modulating area.

In the second embodiment, the sealing resin 26 and the resin structure 27 are provided on different substrates, which makes it easy to adopt different forming methods and different materials for the sealing resin 26 and the resin structure 27. For example, in the light modulating area, the resin structure 27 is finely formed by use of a screen or a metal mask, and outside the light modulating area, the sealing resin 26 is formed by use of a dispenser so that the amount of resin can be reduced to the minimum. For the resin structure 27 to be formed in the light modulating area, a material is selected in consideration for fineness and adhesion, and for the sealing resin 26, a material which has high sealing performance so as to prevent impurities from entering the liquid crystal composition from outside and has long-term reliability is selected. Needless to say, it is possible to provide both the sealing resin 26 and the resin structure 27 on one substrate.

If the sealing resin 26 and the resin structure 27 are made of the same material and formed on one substrate in the same method, the process is easy. Further, forming the sealing resin 26 and the resin structure 27 at the same time simplifies the manufacturing process.

Then, as FIG. 5c' shows, the substrate 21b is placed on a flat heating plate such as a hot plate 30 and is heated. By heating the substrate 21b, the viscosity of the liquid crystal material is reduced so that bubbles will hardly come between the substrates when the substrates are laminated. The heating temperature is set appropriately case by case; however, by setting the heating temperature over the phase transition temperature to the isotropic phase of the liquid crystal material, the fluidity of the liquid crystal material can be heightened. Thereby, changes of the liquid crystal in composition from portion to portion can be suppressed, and unevenness in a display can be prevented.

By semi-hardening the sealing resin before the lamination of the substrates, the substrates can be certainly joined together. For example, if thermosetting resin is used as the material of the sealing resin, the sealing resin can be semi-hardened by being heated by use of the hot plate 30. Here, the "semi-hardened" has the same meaning as described in connection with the first embodiment.

In the case of using thermosetting resin for the sealing resin, if the softening temperature of the resin structure and the hardening temperature of the sealing resin is equal or approximate to each other, only one heating process is necessary, which is extremely efficient. The difference between the softening temperature of the resin structure and the hardening temperature of the sealing resin is desirably not more than 15° C. and more desirably not more than around 10° C.

Figure 12:
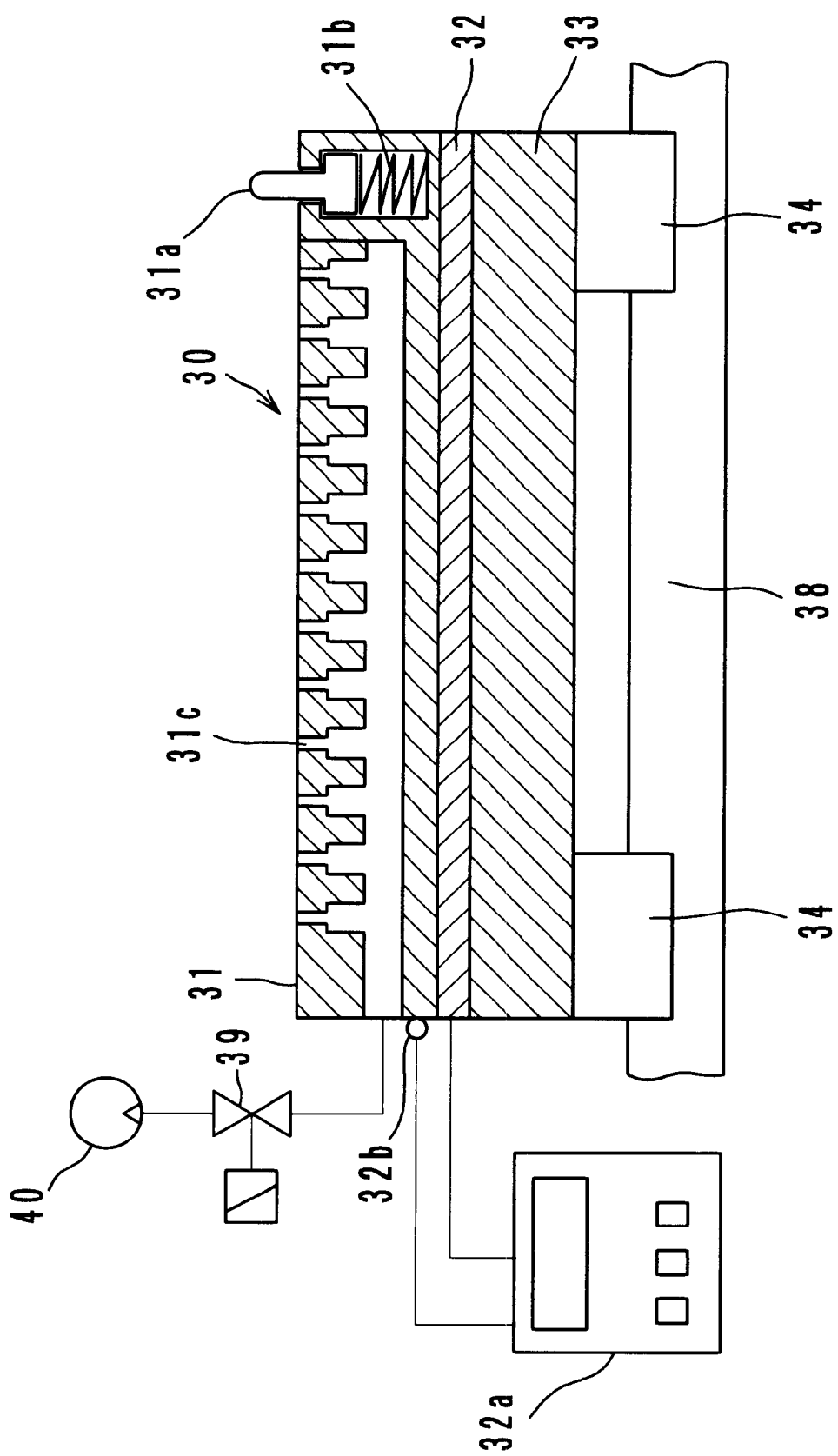
FIG. 12 is a sectional view of a hot plate to be provided in a liquid crystal light modulating device manufacturing apparatus.

FIG. 12 shows the structure of a vacuum sucking hot plate 30 which is an example of a heating flat plate. The hot plate 30 comprises a sucking table 31 which have a plurality of sucking holes 31c to support a substrate to be heated, a planer heater 32 which is fixed on the reverse side of the sucking table 31 and a heat insulating plate 33 made of a baked material or a ceramic material. All the sucking holes 31c communicate with one another in the sucking table 31 and further are connected to a vacuum pump 40 via an electromagnetic valve 39. A substrate is supported on the sucking plate 31 by air suction from the sucking holes 31c. Therefore, if the flexible substrate 21b is heated on the hot plate 30, the substrate 21b will be fixed thereon without expanding by heat, and the whole substrate 21b will be heated evenly.

Figure 5E:
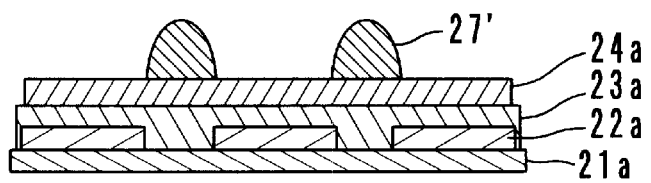
Figure 5A:
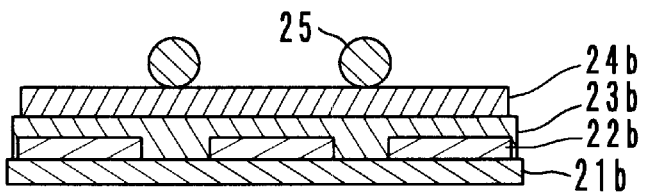
Figure 5B:
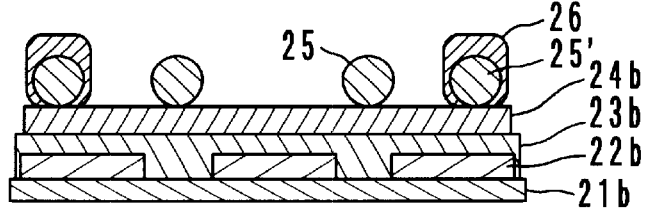
Figure 5C:
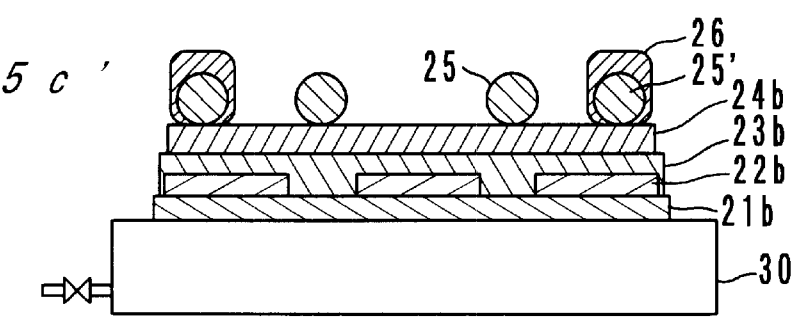

Meanwhile, as FIG. 5e shows, setting resin 27' is provided on the substrate 21a in a specified pattern, and the setting resin 27' is hardened to be made into a resin structure 27. As the setting resin 27', photosetting resin, thermosetting resin, electrobeam setting resin, etc. can be used, and it must be the one which, after being hardened, is softened at a temperature lower than the softening temperature of the substrate 21a.

The substrate 21a with the resin structure 27 formed thereon and the substrate 21b with the spacers 25 and the sealing resin 26 provided thereon are laminated.

FIG. 6 shows a process of laminating the substrates. For lamination of the substrates, at least one of the substrates 21a and 21b is heated to soften the resin structure 27. As FIG. 6 shows, the liquid crystal composition 28 is dropped on the substrate 21a fixed on the hot plate 30 at a side, and a side of the substrate 21b is laid on the side of the substrate 21a where the liquid crystal composition was dropped. Thereafter, while the other side of the substrate 21b is lifted, thereby bending the substrate 21b, the substrate 21b is pressed against the substrate 21a by a pressing member, whereby the liquid crystal composition 28 is spread. As the pressing member, it is preferred to use a heating roller. FIG. 6 shows a case wherein a pressing roller 51 and a pressing heating roller 52 which is located downstream of the roller 51 press the substrate 21b.

The substrate 21a is placed on the hot plate 30 which has been heated to a specified temperature with the surface having the aligning layer 24a facing up. In this state, the liquid crystal composition 28 is dropped on the substrate 21a at a side. The volume of liquid crystal composition 28 dropped on the substrate 21a is larger than the volume of the space enclosed by the sealing resin 26 and the substrates 21a and 21b.

The sealing resin 26 is preferably in a semi-hardened state until the substrates 21a and 21b have been completely joined. Thereby, the sealing resin 26 can be prevented from fusing into the liquid crystal composition 28. Further, if the sealing resin 26 is provided on the other substrate than the one provided with the resin structure, the semi-hardened sealing resin 26 is heated only when it is pressed by the pressing member. Thereby, the sealing resin 26 is prevented from being hardened excessively and losing its adhesion.

After the lamination, as described in connection with the first embodiment, as shown FIG. 7, the substrates 21a and 21b are sandwiched between a pair of flat plates 75, and a load is applied for a specified time under a specified temperature. When a sufficient time for complete adhesion has passed, the substrates are cooled, and the flat plates 75 are removed. Thus, a liquid crystal display device is finally produced. It is preferred to cool the substrates gradually while keeping applying the load.

The following is a specific example of the liquid crystal display device according to the second embodiment.

EXAMPLE 2

As the first substrate, the above-mentioned 7059 glass was used. On this substrate, an ITO (indium tin oxide) layer with a thickness of 200 nm was formed by a sputtering method. As the second substrate, a flexible transparent conductive film FST-5352 (made by Sumitomo Bakelite Co., Ltd.) was used. An ITO layer was formed on this film, too. The ITO layer on the substrates were patterned by a lithography method, and thereby, transparent electrode strips with a width of 300 μm were formed at a pitch of 350 μm.

Next, on the transparent electrodes on the substrates, thin layers (with a thickness of 1000 Å) of Polysilazane L120 (made by Tonen Corporation) were formed by a spin coat method. Then, the substrates with the thin layers formed thereon were heated in a constant temperature bath at 120° C. for two hours and further heated in a constant temperature constant humidity bath at 90° C. and at 85% for three hours. Thus, insulating layers were formed on the substrates. Next, on the insulating layers of the substrates, thin layers (with at thickness of 500 Å) of an aligning material AL4552 (made by JSR) were formed by a spin coat method, and the substrates were heated in an isothermal tank at a temperature of 165° C. for two hours.

Thereafter, a rubbing treatment was carried out on the aligning layers formed on the substrates. As FIG. 9 shows, with respect to the rubbing treatment toward the substrate 21a, the rubbing direction R tilted clockwise at 45° to the extending direction of the electrode strips 22a, and with respect to the rubbing treatment toward the substrate 21b, the rubbing direction R tilted counterclockwise at 45° to the extending direction of the electrode strips 22b.

Next, the above-mentioned Micropearl SP-2045 with a diameter of 4.5 μm were dispersed on the second substrate as spacers. The dispersion was carried out as follows: water and isopropanol were mixed at a ratio by volume of 1:1; the spacers were dispersed in this solvent; and this was sprayed on the aligning layer of the second substrate by use of a spray bottle. Micropearl SP-2045 with a diameter of 4.5 μm was mixed into a sealing material, Struct Bond XN-21-S (made by Mitsui Toatsu Co., Ltd.), and this was dispensed in dots on the second substrate at the sides by use of a liquid crystal sealing resin dispenser MLC-III (Musashi Engineering Inc.). At this time, as FIG. 10 shows, the sealing resin 26 was formed into a circle enclosing the light modulating area.

After the dispensation of sealing resin, the second substrate was fixed on the hot plate 30 shown by FIG. 12 and heated to 80° C. for 30 minutes.

Next, a resin structure was formed on the first substrate. In this example, Aronmelt PES-360SA40 (made by Three Bond Co., Ltd.) which is thermoplastic resin (polyester resin) was used. On the first substrate, this thermosetting resin was printed into dots with a diameter of 50 μm at a pitch of 350 μm by a screen printing method. These substrates were laminated by use of the laminating device shown by FIGS. 13 through 15.

The first substrate was vacuum-sucked and fixed on the hot plate 30 which had been heated to 80° C. with the aligning layer facing up, and a liquid crystal composition was dropped at an end of the first substrate. The volume of dropped liquid crystal composition, as described in connection with the first embodiment, was larger than the volume of the space enclosed by the substrates and the sealing resin. As the liquid crystal composition, ZL11565 (made by Merck & Company), which is used in a TN mode, containing S811 (made by Merck & Company) as a chiral agent at 0.7 wt % was used.

Next, as FIG. 11 shows, an end of the second substrate 21b was laid on the end of the first substrate 21a where the liquid crystal composition 28 had been dropped in such a way that the transparent electrode strips 22b on the second substrate 21b would be perpendicular to the transparent electrode strips 22a on the first substrate 21a and that the rubbing directions R on the respective aligning layers would be perpendicular to each other. Then, the hot plate 30 was moved to rotate the silicon rubber rollers 51 and 52. Thereby, the second substrate 21b was laid over the first substrate 21a while the liquid crystal composition 28 was spread.

At this time, the temperature of the surface of the silicone rubber roller 52 was set to 150° C. While softening the resin structure 27, the silicone rubber roller 52 applied pressure to the second substrate 21b to make the gap between the substrates 21a and 21b as regulated by the spacers 25. The substrates 21a and 21b which had been laminated by the rollers 51 and 52 was placed between a pair of stainless flat plates 75 with polished surfaces via silicone rubber sheets 76, and while a load of 0.3 kg/cm$^2$ was applied, the substrates 21a and 21b were kept in a constant temperature bath at 150° C. for 90 minutes. Thereafter, the power source of the constant temperature bath was turned off, and the substrates 21a and 21b were cooled down to a room temperature in the constant temperature bath with the load kept applied. In this way, a liquid crystal display device was fabricated.

The liquid crystal display device, which operated in a TN mode, had a uniform gap between the substrates and made an even display.

First Embodiment of a Manufacturing Apparatus; See FIGS. 12 through 15

Figure 13:
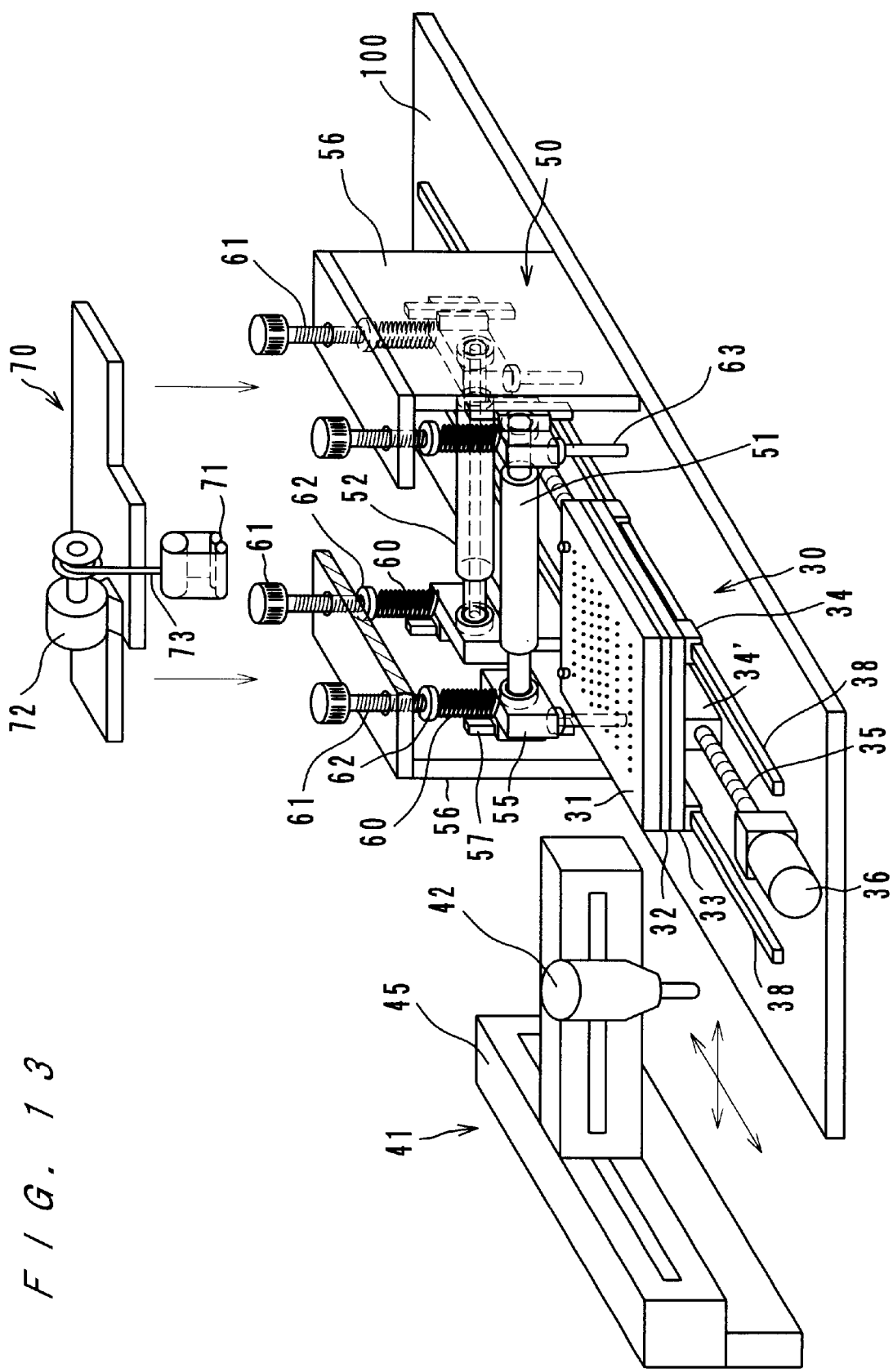
FIG. 13 is a perspective view of a first embodiment of a manufacturing apparatus employing the hot plate.
Figure 14:
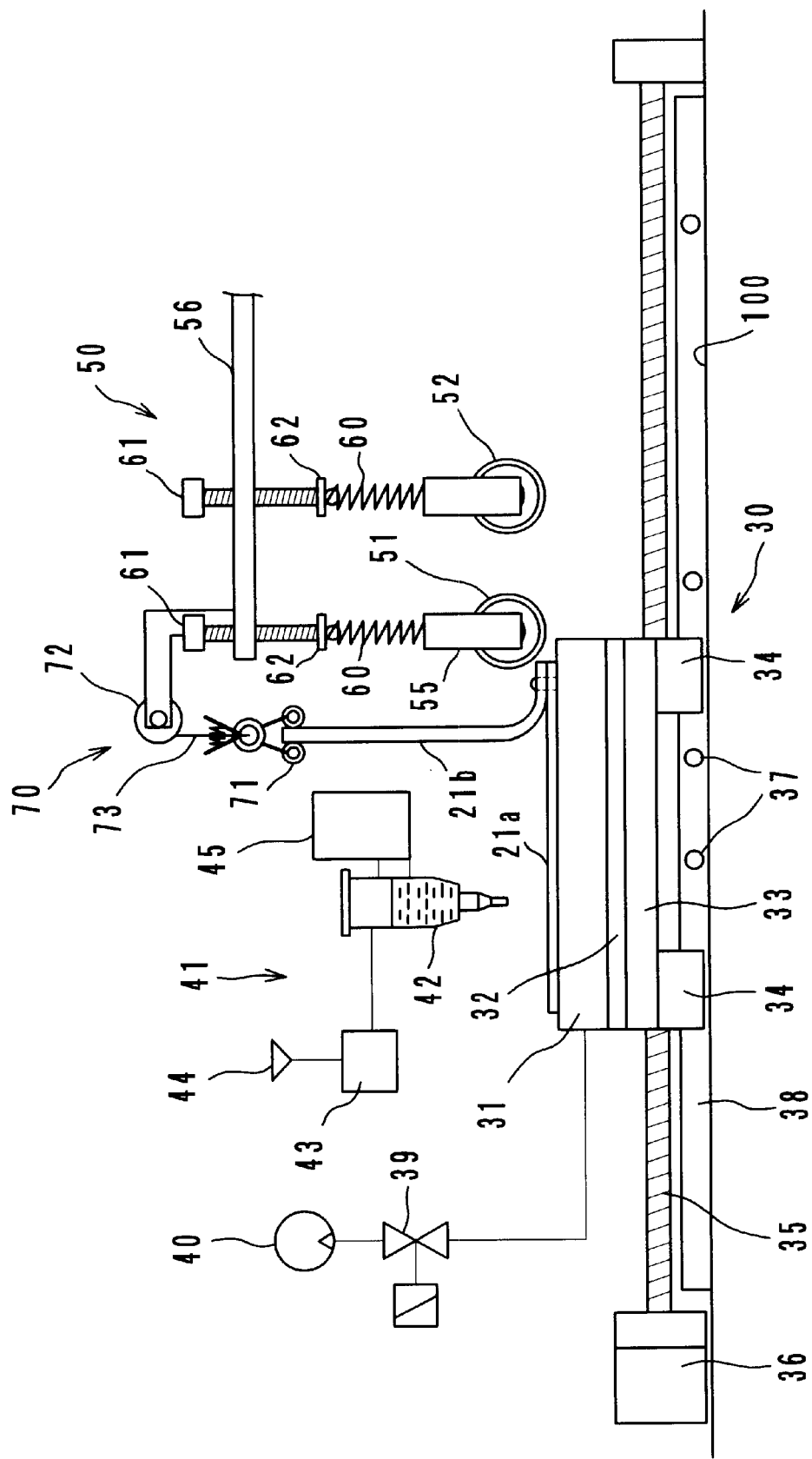
FIG. 14 is a schematic front view of the manufacturing apparatus.

Next, the first embodiment of a manufacturing apparatus which can be used to laminate the substrates. FIG. 13 is a perspective view of a laminating device. FIG. 14 shows a process of laminating the substrates 21a and 21b by use of the laminating device.

This laminating device comprises a hot plate 30 which supports and moves the substrate 21a, a discharging unit 41 which discharges a specified volume of liquid crystal composition 28, a pressing/heating unit 50 which presses and heats the substrates 21a and 21b, and a holding unit 70 which holds the second substrate 21b at the trailing end.

FIG. 12 shows the hot plate 30. On the lower surface of the heat insulating plate 33, LM blocks 34 and a nut block 34' are provided. The LM blocks 34 slide on LM rails 38 provided on a base plate 100 (see FIG. 13). The nut block 34' is screwed to a ball thread 35 of which driving source 36 is a servo motor or a speed control motor. With forward or reverse rotation of the ball thread 35, the nut block 34', the LM blocks 34 and the hot plate 30 slide on the rails 38 together.

As FIG. 12 shows, on the sucking table 31, a pin 31a is provided for positioning of the substrate 21a. When the hot plate 30 slides and comes to a position to face the pressing roller 51 and the pressing/heating roller 52 in the pressing and heating unit 50, a coil spring 31b provided on the rear side of the pin 31a shrinks, and the pin 31a comes down because of the pressure applied from the rollers 51 and 52. Thus, the pin 31a does not apply a load to the rollers 51 and 52.

Because the substrate 21a is supported and fixed on the hot plate 30 by air suction from the sucking holes 31c shown FIG. 12, it is not necessary to press the substrate 21a from above, which simplifies the structure of the device and avoids contamination. Also, if the substrate 21a is a film, the substrate 21a does not expand. In a case wherein the substrate 21a is pressed from above to be fixed on the hot plate 30, the substrate is pressed at side portions so that movement of the pressing roller will not be obstructed. In this case, especially when a flexible large substrate is to be supported, it is difficult to keep the whole substrate flat.

Further, a temperature sensor 32b is provided in the vicinity of the sucking table 31. The temperature sensor 32b is connected to a temperature controller 32a, and the temperature controller 32a carries out on/off control of the heater 32 to regulate the temperature of the sucking table 31.

In the vicinity of the LM rails 38, a position detector 37, for example, a photosensor or a limit switch is provided (see FIG. 14), and this position detector 37 sends a control signal to the driving source 36.

The discharging unit 41 comprises a cylinder which contains a liquid crystal composition and discharges the liquid crystal composition through a discharge opening, an air pressure source 44 which supplies air into the cylinder 42, a controller 43 which controls the air pressure source 44 to regulate the volume of the liquid crystal composition to be discharged from the cylinder 42, an X-Y robot mechanism 45 which makes the controller 43 and the cylinder 42 move and stop above the sucking table 31.

The pressing/heating unit 50, as FIGS. 13 and 14 show, has a pressing roller 51 and a pressing/heating roller 52. When the substrates 21a and 21b, which move together with the hot plate 30, come to a position to face the rollers 51 and 52, the rollers 51 and 52 press the substrates 21a and 21b against the hot plate 30 and heat them.

Figure 15:
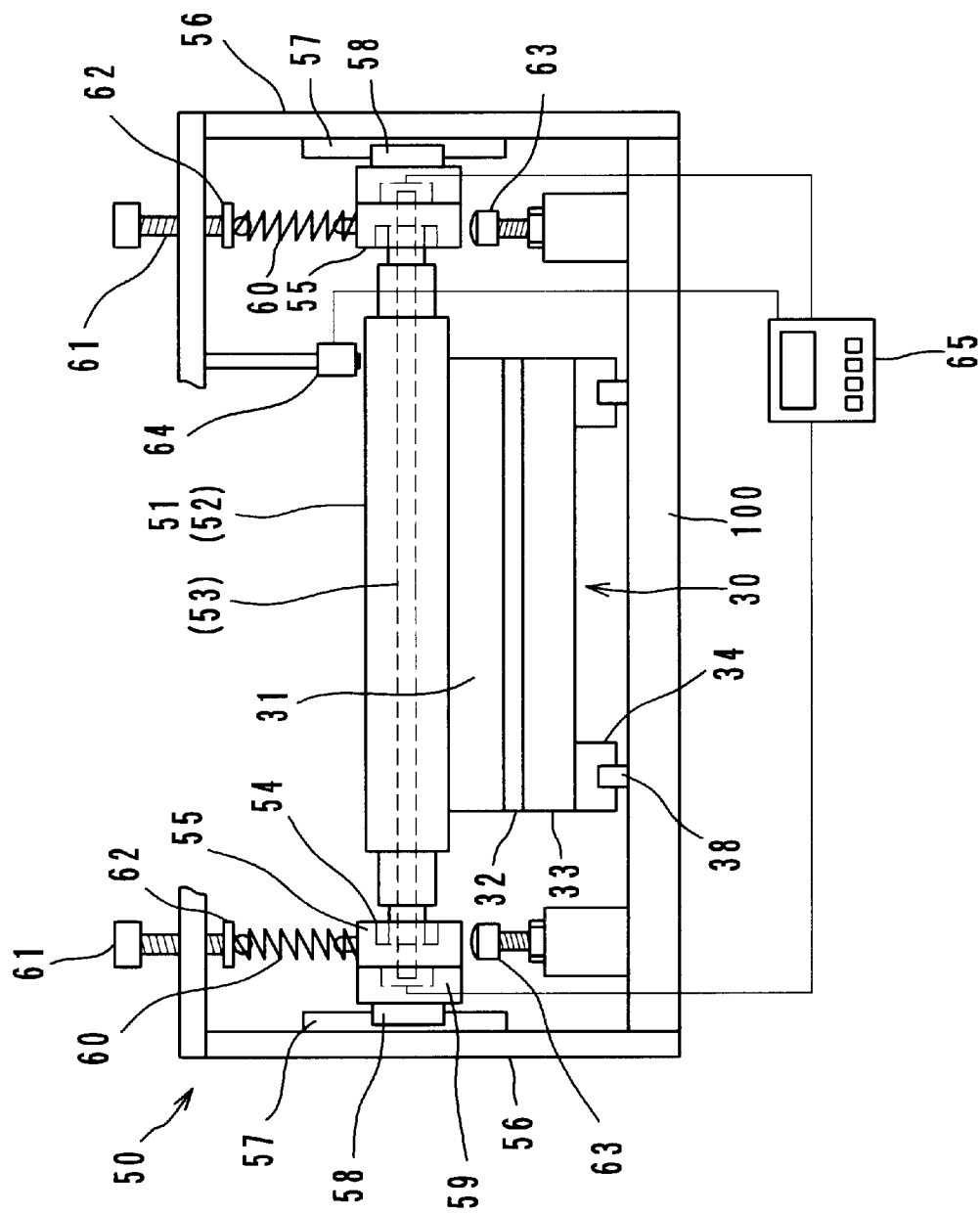
FIG. 15 is a schematic side view of the manufacturing apparatus.

As FIG. 15 shows, both ends of the pressing roller 51 are fitted to bearing holders 55 via bearings 54. A frame 56 is fitted on the base 100, and LM rails 57 are fitted to the frame 56. The bearing holders 55 are connected to LM blocks 58 which slides on the LM rails 57 via connecting blocks 59. Thereby, the pressing roller 51 is supported to be capable of sliding above the hot plate 30.

Above the bearing holders 55, springs 60 which press the respective bearing holders 55 and adjusting bolts 61 which adjust the tightness of the springs 60 are provided. The adjusting bolts 61 are screwed in tapped holes made in the frame 56, and stoppers fitted to the ends of the adjusting bolts 60 press the springs 60. Because the tightness of the springs 60 can be adjusted by rotation of the adjusting bolts 61, the pressure from the pressing roller 51 can be adjusted so that a pressure will be uniformly applied to the whole substrates 21a and 21b. Further, stoppers 63 are provided under the bearing holders 55 to prevent the pressing roller 51 from applying pressure excessively to the substrates 21a and 21b. It is preferred that the pressure from the pressing roller 51 is smaller than the pressure from the pressing/heating roller 52.

The supporting mechanism of the pressing/heating roller 52 is the same as that of the pressing roller 51. However, the pressing/heating roller 52 is hollow, and a stick-like heater 53 is provided in the roller 52. The heater 53 heats the surface of the pressing/heating roller 52. In the vicinity of the pressing/heating roller 52, a temperature sensor 64, which may be of either a contact type or a non-contact type, is provided. The temperature sensor 64 is connected to a temperature controller 65 which controls the temperature of the surface of the roller 52.

Preferably, the surfaces of the rollers 51 and 52 are flat and mold releasing, and for example, silicone rubber is suited to be used for the rollers 51 and 52.

The substrate holding unit 70 comprises a pair of holding rollers 71 which holds the trailing end of the substrate 21b and a motor 72 for wind and rewind of a wire 73 connected to the holding rollers 71 at an end. When the leading end of the hot plate 30 comes to a position to face the pressing roller 51, the motor 72 starts running for rewind of the wire 73, and then, the holding rollers 71 are moved downward in synchronization with the movement of the hot plate 30.

Second Embodiment of a Manufacturing Apparatus; See FIG. 16

Figure 16:
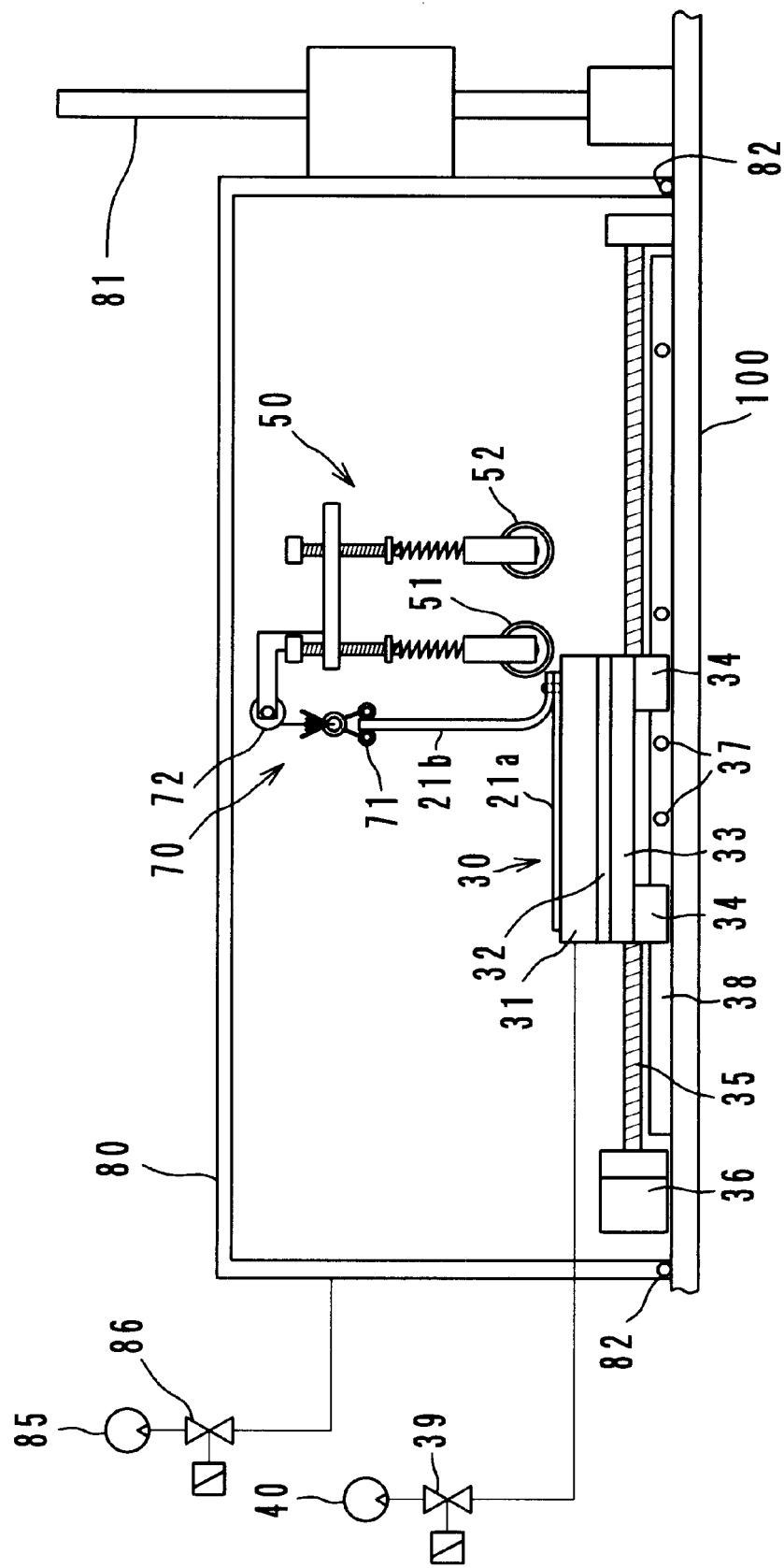
FIG. 16 is a schematic view of a second embodiment of the manufacturing apparatus.

FIG. 16 shows the second embodiment of the manufacturing apparatus. In this laminating device, the hot plate 30, the pressing/heating unit 50, etc. are enclosed in a vacuum chamber 80 on the base 100. The vacuum chamber 80 is supported by an elevating mechanism 81 and is capable of moving up and down. An O-ring 82 is provided between the vacuum chamber 80 and the base 100 so as to maintain the tightness of the chamber 80. The inside of the vacuum chamber 80 is connected to a vacuum pump 85 via an electromagnetic valve 86 so that the pressure in the vacuum chamber 80 will be reduced.

By using this laminating device wherein the inside of the chamber 80 is kept clean, intrusion of impurities and bubbles into the liquid crystal composition 28 between the substrates 21a and 21b can be prevented more positively.

Third Embodiment of a Manufacturing Apparatus; See FIG. 17

Figure 17:
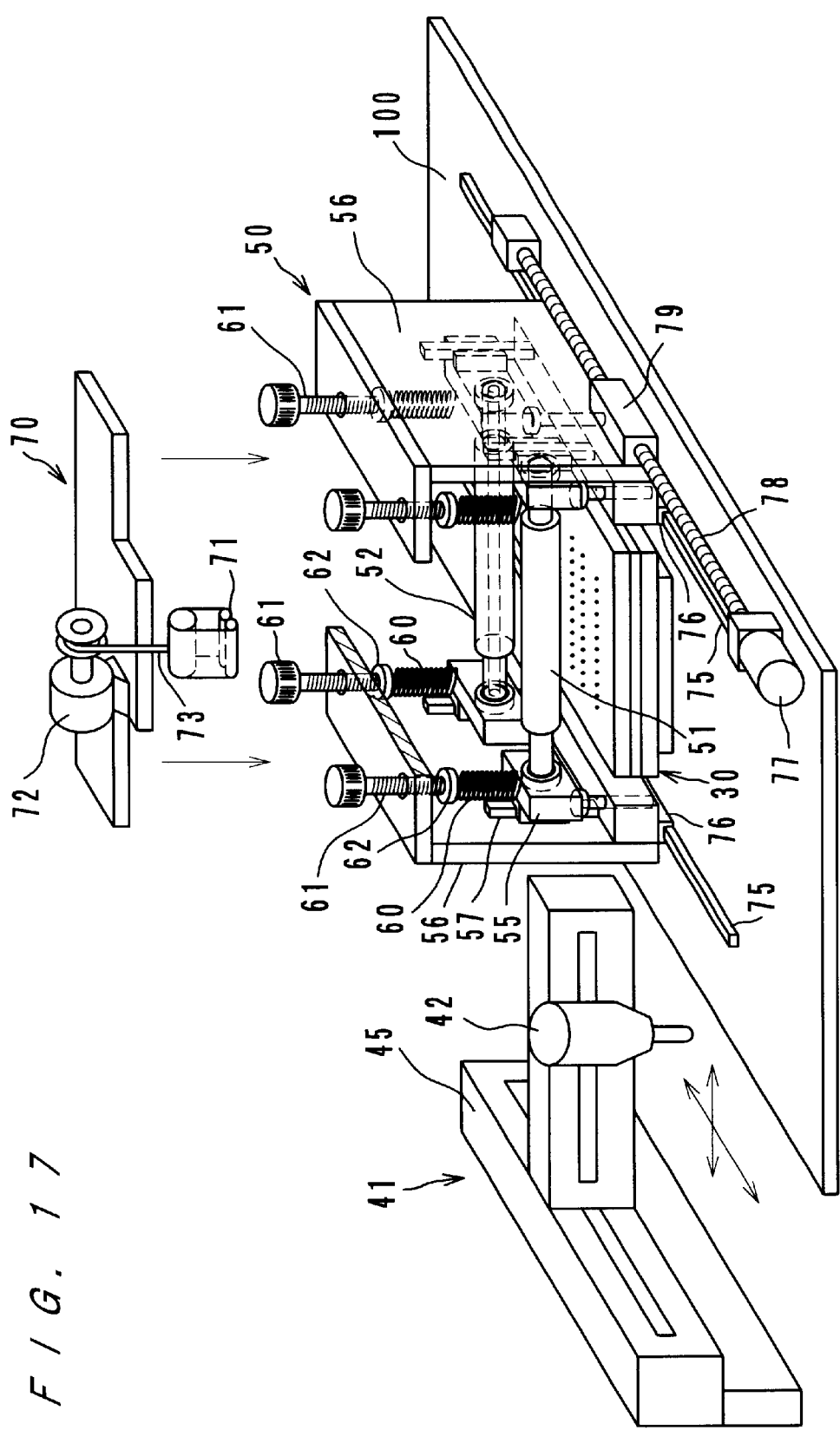
FIG. 17 is a perspective view of a third embodiment of the manufacturing apparatus.

FIG. 17 shows the third embodiment of the manufacturing apparatus. In this laminating device, the hot plate 30 is fixed, and the pressing/heating unit 50 is movable. Specifically, a frame 56 which supports the rollers 51 and 52 is fitted to LM blocks 76 which slide on LM rails 75 provided on the base 100. Further, on one side of the frame 56, a nut block 79 which is connected to a ball nut 78 driven by a driving source 77 is fitted. With this mechanism, the pressing/heating unit 50 slides on the LM rails 75. The other parts of this laminating device are of the same structure as those of the laminating device shown by FIGS. 12 through 15. These parts and members are provided with the same reference symbols shown in FIGS. 12 through 15, and the description thereof is omitted.

Further, it is possible to make both the hot plate 30 and the pressing/heating unit 50 movable. The point is that the hot plate 30 and the pressing/heating unit 50 are relatively movable to and from each other for lamination of substrates.

Third Embodiment of a Liquid Crystal Light Modulating Device; See FIGS. 18 and 19

Described as the third embodiment below is a reflective type liquid crystal display device 20' which has three-layered liquid crystal panels having liquid crystal compositions which exhibit a cholesteric phase at room temperature and selectively reflect light of mutually different wavelengths. For fabrication of this liquid crystal display device 20', a method wherein a liquid crystal composition with spacers therein is coated on substrates is adopted.

FIG. 18 is a sectional view of the liquid crystal display device 20'. This display device 20' is different from the second embodiment in the following points: that flexible substrates 21a and 21b are used for all the three layers; liquid crystal compositions 28 which exhibit a cholesteric phase in a room temperature are used; and three liquid crystal panels each of which is composed of a pair of substrates 21a and 21b are arranged in three layers.

In the third embodiment, because the liquid crystal compositions contained in the three layers selectively reflect light of mutually different wavelengths, the layers can be made in a reflecting state or in a transparent state selectively, and accordingly, color display is possible. For example, if liquid crystal display elements which use liquid crystal compositions which were prepared to selectively reflect light of red, green and blue, respectively, are arranged in three layers, full-color display becomes possible. In the following, only the parts different from the second embodiment are described.

FIG. 19 shows part of a manufacturing process of the liquid crystal display device 20', which is different from the second embodiment. First, the substrates 21a and 21b are prepared in the way described in connection with the second embodiment. Next, as FIG. 19a shows, the substrate 21a is placed on a hot plate 30, which is of a vacuum sucking type employed in the laminating device shown by FIG. 16, and the liquid crystal composition 28 is dropped on the substrate 21a at a side. Then, the pressure in the vacuum chamber 80 is reduced, and as FIG. 19b shows, an end of the substrate 21b is laid on the side of the substrate 21a where the liquid crystal composition was dropped in such a way that the electrode strips 22a on the substrate 21a and the electrode strips 22b on the substrate 21b will be perpendicular to each other. Subsequently, the substrates 21a and 21b are laminated by use of the pressing roller 51 and the pressing/heating roller 52.

For each layer, the substrates 21a and 21b are joined together in the above-described way. Then, an adhesive 29 is dropped between the layers, and the layers are bonded, while the pixels on the layers will be aligned. As the adhesive 29, setting resin such as thermosetting resin and photosetting resin and thermoplastic resin can be used. It is also possible to join the layers together by a pressure sensitive adhesive.

A light absorbing layer is provided on the surface of the substrate 21a with no electrodes thereon, and when the three layers are laminated, the substrate 21a is placed at the bottom with this light absorbing layer facing down. Also, it is possible to provide a light absorbing layer on the surface of the substrate 21a with the electrodes 22a thereon. In this case, it is preferred that the light absorbing layer is provided between the substrate 21a and the transparent electrodes 22a because it does not require increasing the voltage to be applied; however, the light absorbing layer may be provided between the transparent electrodes 22a and the liquid crystal composition 28. When the light absorbing layer is provided the outer surface of the substrate 21a, the light absorbing layer may be a dye such as black lacquer.

The following is a specific example of the liquid crystal display device of the third embodiment.

EXAMPLE 3

As the substrates for each liquid crystal panel, two flexible transparent conductive films FST-5352 were used, and transparent electrodes in the form of strips were formed on the substrates in the way described in connection with the second embodiment. On the electrodes formed on the substrates, insulating layers and aligning layers were provided in the way described in connection with the second embodiment. However, a rubbing treatment was not carried out on the aligning layers.

For the first layer (the uppermost layer in FIG. 18), a liquid crystal composition which had been prepared by adding the chiral agent S811 to nematic liquid crystal E44 (both are made by Merck & Company) at 32 wt % was used so that the first (uppermost) liquid crystal layer would reflect light of 490 nm (blue). For the second layer (the middle layer in FIG. 18), a liquid crystal composition which had been prepared by adding the chiral agent S811 to the nematic liquid crystal E44 at 30 wt % was used so that the second liquid crystal layer would reflect light of 560 nm (green). For the third layer (the bottom layer in FIG. 18), a liquid crystal composition which had been prepared by adding the chiral agent S811 to the nematic liquid crystal E44 at 25 wt % was used so that the third layer would reflect light of 680 nm (red).

In the liquid crystal composition for the first layer, SP205 (made by Sekisui Fine Chemical Co., Ltd.) with a diameter of 5 μm was dispersed as spacers so that the gap between the substrates would be 5 μm. In the liquid crystal composition for the second layer, SP207 (made by Sekisui Fine Chemical Co., Ltd.) with a diameter of 7 μm was dispersed as spacers so that the gap between the substrates would be 7 μm. In the liquid crystal composition for the third layer, SP209 (made by Sekisui Fine Chemical Co., Ltd.) with a diameter of 9 μm was dispersed as spacers so that the gap between the substrates would be 9 μm. Ultraviolet ray setting resin (epoxy resin) UV RESIN T-470/UR-7092 (made by Nagase-Ciba Ltd.), of which transit temperature to glass was 144° C., was used as sealing resin, and for the first, second and third layers, spacers with a diameter of 5 μm, spacers with a diameter of 7 μm and spacers with a diameter of 9 μm were mixed in the sealing resin, respectively. After the ultraviolet setting resin was coated on one of the substrates for each layer by a screen printing method, the substrates were irradiated with light of 4000 mJ/cm$^2$ (total amount) by use of a high pressure mercury lamp HMW-244-11CM of 4 kW (made by ORC Manufacturing Co., Ltd.).

On the other substrate for each layer, a resin structure with a larger height than the gap between the substrates for the layer was made of ultraviolet ray setting resin UV RESIN T-7092 in the way described in connection with the second embodiment.

Thus, the substrates 21a and 21b were prepared. The substrate 21a was vacuum-sucked on the hot plate 30, and the liquid crystal composition 28 in which the spacers 25 with a specified particle diameter had been dispersed was coated on the substrate 21a at a side. Next, the substrate 21b was fitted to the laminating device, and the pressure in the vacuum chamber was reduced. Then, an end of the substrate 21b was laid on the side of the substrate 21a on which the liquid crystal composition had been coated, and the substrates 21a and 21b were laminated by use of the laminating device shown by FIG. 16 in such a way that the electrode strips 22a on the substrate 21a and the electrode strips 22b on the substrate 21b would be perpendicular to each other.

In this way, the substrates 21a and 21b were laminated to form each layer. Thereafter, ultraviolet ray setting resin Photolec A-704-180 (made by Sekisui Finechemical Co., Ltd.) was dropped between the layers as the adhesive 29, and the three layers were joined together by being radiated with ultraviolet rays in such a way that the pixels in the three layers would be aligned. Although ultraviolet ray setting resin was used as the adhesive in the example, it is possible to use thermosetting resin and thermoplastic resin. Also, the layers can be joined together by a pressure sensitive adhesive.

Further, on the surface of the substrate 21a of the third layer on which the transparent electrodes 22a had not been formed, black resist CFPR BK-730S (made by Tokyo Ohka Kogyo Co., Ltd.) was coated as the light absorbing layer 19. When the three layers were laminated, the surface provided with the light absorbing layer 19 was the bottom.

In this way, a reflective type liquid crystal display device was fabricated. When a relatively low pulse voltage was applied to the layers, the layers came to a focal conic state and became transparent. When a relatively high pulse voltage was applied to the layers, the layers came to a planar state and reflected light of the respective colors. When an intermediate pulse voltage was applied to the layers, the layers made half-tone displays. In either case, the display was maintained after the voltage was turned off By applying voltages to the layers separately, full-color display with high brightness and high visibility was possible.

Fourth Embodiment of a Liquid Crystal Light Modulating Device; See FIG. 20

Described as the fourth embodiment below is an in-polymer dispersed liquid crystal display device 90 which uses a polymeric material in which a liquid crystal composition is dispersed.

FIG. 20 is a sectional view of the liquid crystal display device 90. On flexible substrates 91a and 91b, transparent electrode strips 92a and 92b are formed, and further, insulating layers 93a and 93b and aligning layers 94a and 94b are provided if necessary. On the sides of the substrates 91a and 91b, sealing resin 96 which is thermoplastic resin is provided as an adhesive. A liquid crystal composition 98 dispersed in a polymeric material 97 is sandwiched between the substrates 91a and 91b as a display medium, and the gap between the substrates 91a and 91b is regulated by spacers 95.

This liquid crystal display device 90 can be fabricated as follows. As described in connection with the second embodiment, on the substrates 91a and 91b on which the electrode strips 92a and 92b have been formed by patterning, respectively, the insulating layers 93a and 93b and the aligning layers 94a and 94b are formed if necessary. Further, if necessary, a rubbing treatment and an alignment treatment by radiation of ultraviolet rays are carried out on the aligning layers 94a and 94b. Subsequently, on at least one of the substrates, for example, on the substrate 91b, the sealing resin 96 containing spacers 95' is provided.

On the other substrate 91a, the spacers 95 are dispersed, and the polymeric material 97 with the liquid crystal composition 98 dispersed therein is dropped. The substrates 91a and 91b are laminated and joined together in the way described in connection with the second embodiment. Then, for example, if photosetting resin is used as the polymeric material, the photosetting resin is polymerized by radiation of light.

The following is a specific example of the liquid crystal display device of the fourth embodiment.

EXAMPLE 4

As the substrates, two flexible transparent conductive films FST-5352 were used, and transparent electrodes were formed on the substrates in the way described in connection with the second embodiment. On the electrodes formed on the substrates, insulating layers and aligning layers were formed in the way described in connection with the second embodiment.

The above-described spacers SP220 with a particle diameter of 20 μm were mixed in thermoplastic resin (polyester resin) Aronmelt PES-360SA40 (made by Three Bond Co., Ltd.), and this was provided on one of the substrates in the form of a circle along the sides as shown in FIG. 10 as the sealing resin by a screen printing method.

On the other substrate, the spacers SP220 were dispersed. Prepared as the display medium was a mixture of 85 wt % of a liquid crystal component and 15 wt % of a polymeric material. As the liquid crystal component, nematic liquid crystal E8 (ordinary index $n_o$=1.525, anisotropy of refractive index Δn=0.246) (made by Merck & Company) which contains the chiral agent S811 at 12 wt % was used. As the polymeric material, ultraviolet ray setting type acrylic monomer R128H (refractive index=1.526) (made by Nippon Kayaku Co., Ltd.) which contains a photopolymerization initiator Darocur 1173 (made by Nagase-Ciba Ltd.) at 10 wt % was used. This display medium was dropped on the substrate, and the two substrates were laminated and joined together by use of the laminating device shown by FIGS. 12 through 15 in the way described in connection with the second embodiment.

After the lamination of the substrates, ultraviolet rays of 365 nm were radiated from an extra-high pressure mercury lamp at 600 mJ/cm$^2$ so as to polymerize the acrylic monomer. Further, if necessary, a heating/cooling process may be provided before or after this process.

In this way, an in-polymer dispersed liquid crystal display device was fabricated. During the fabrication of the device, a process of filling the display medium between the substrates could be carried out efficiently, and bubbles hardly intruded into the display medium.

Other Embodiments

Liquid crystal light modulating devices, and manufacturing apparatus and manufacturing methods thereof according to the present invention are not limited to the above-described embodiments.

The components of the liquid crystal composition and the materials of the substrates and the adhesives, etc. can be optionally selected.

Although the laminating devices described in the above embodiments are of a type which has two rollers, namely, a pressing roller and a pressing/heating roller, a laminating device may have three or more rollers. With respect to a laminating device with three or more rollers, it is preferred that the more downstream in the substrate traveling direction the roller is located, the larger pressure the roller applies. Also, a heating roller is preferably located in the most downstream position. Moreover, it is possible to provide only a single pressing/heating roller in a laminating device.

In the laminating devices described in the above embodiments, the trailing end of a substrate is held by a pair of holding rollers, and the holding rollers are moved up and down by a reel. However, the end of the substrate can be held on a plate which moves together with the hot plate or an array of rollers. Any mechanism can be adopted as long as it can hold the end of the upper substrate in a specified position away from the lower substrate while the substrates are moving.

Further, in the laminating devices described in the above embodiments, an X-Y robot mechanism is adopted to enable a syringe which dispenses a liquid crystal composition to move freely in a plane opposite the hot plate. Other methods can be adopted for dispensation of the liquid crystal composition. For example, the syringe may be capable of moving only in the direction traversing the substrate. Also, it is possible to provide a plurality of fixed syringes or slit-like supply ports arranged in the direction traversing the substrate or a die-coater in a position not to interfere with the laminating operation.

The springs which supply the pressing roller and the pressing/heating roller with pressures may be replaced by an air pressure mechanism such as air cylinders.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method of manufacturing a liquid crystal light modulating device including a first substrate and a second substrate, at least one of which is flexible, a liquid crystal material filled between the first and second substrates, and a seal surrounding the liquid crystal material to prevent the liquid crystal material from leaking, said method comprising the steps of:

(a) providing the seal on at least one of the first and second substrates, the step (a) including the steps of:
(a1) providing the seal which is not hardened on at least one of the first and second substrates; and
(a2) incompletely hardening the seal after the step (a1);
(b) dispensing the liquid crystal material onto the first substrate; and
(c) placing, after the execution of the steps (a) and (b), the second substrate onto the first substrate and hardening the seal to join the first and second substrates together.

2. A method as claimed in claim 1, wherein the seal is provided on the second substrate in the step (a).

3. A method as claimed in claim 1, wherein the seal is provided to continuously enclose a light modulating area in the step (a).

4. A method as claimed in claim 1, further comprising the step of:
(d) placing the first substrate on a support, wherein the step (b) is executed after the step (d).

5. A method as claimed in claim 1, wherein the step (b) comprises the steps of:
(b1) placing the first substrate onto a support; and
(b2) dispensing the liquid crystal material onto the first substrate placed on said support.

6. A method as claimed in claim 1, further comprising the step of:
(d) providing, before the step (c), a resin structure on at least one of the first and second substrates to be located in a light modulating area.

7. A method as claimed in claim 1, wherein the step (c) comprises the steps of:
(c1) pressing the first substrate against the second substrate;
(c2) heating the seal; and
(c3) cooling the seal after the step (c2).

8. A method as claimed in claim 7, wherein the steps (c2) and (c3) are executed during the step (c1).

9. A method as claimed in claim 7, wherein the seal is incompletely hardened by heat during the step (a2), and wherein a heating temperature during the step (a2) is lower than a heating temperature during the step (c2).

10. A method as claimed in claim 1, wherein the seal is incompletely hardened by heat during the step (a2).

11. A liquid crystal light modulating device comprising:
a first substrate and a second substrate, at least one of which is flexible;
a liquid crystal material filled between the first and second substrates; and
a seal surrounding the liquid crystal material to prevent the liquid crystal material from leaking;
wherein the liquid crystal light modulating device is manufactured by executing the steps of:
(a) providing the seal on at least one of the first and second substrates, the step (a) including the steps of:
(a1) providing the seal which is not hardened on at least one of the first and second substrates; and
(a2) incompletely hardening the seal after the step (a1);
(b) dispensing the liquid crystal material onto the first substrate; and (c) placing, after the execution of the steps (a) and (b), the second substrate onto the first substrate and hardening the seal to join the first and second substrates together.

12. A liquid crystal light modulating device as claimed in claim 11, further comprising:
   a resin structure located within a light modulating area of the first and second substrates, said resin structure having been provided on at least one of the first and second substrates before the step (c).

13. A liquid crystal light modulating device as claimed in claim 12, wherein said resin structure bonds the first and second substrates together.

14. A method of manufacturing a liquid crystal light modulating device including a first substrate and a second substrate, at least one of which is flexible, a liquid crystal material filled between the first and second substrates and a seal surrounding said liquid crystal material to prevent said liquid crystal material from leaking, said method comprising the steps of:
   (a) providing the seal on the second substrate,
   (b) dispensing the liquid crystal material on the first substrate;
   (c) providing a plurality of resin-coated spacers on at least one of the first and second substrates to be located in a light modulating area; and
   (d) placing, after the execution of the steps (a) through (c), the second substrate onto the first substrate and hardening the seal to join the first and second substrates together.

15. A method as claimed in claim 14, wherein the step (b) comprises the steps of:
   (b1) placing the first substrate onto a support; and
   (b2) dispensing the liquid crystal material onto the first substrate placed on said support.

16. A method as claimed in claim 14, wherein, in the step (d), said resin-coated spacers are provided on the second substrate.

17. A method of manufacturing a liquid crystal light modulating device including a first substrate and a second substrate, at least one of which is flexible, a liquid crystal material filled between the first and second substrates and a seal surrounding said liquid crystal material to prevent said liquid crystal material from leaking, said method comprising the steps of:
   (a) forming an alignment layer on at least one of the first and second substrates inside of an area to be surrounded by the seal;
   (b) providing the seal on the second substrate;
   (c) dispensing the liquid crystal material on the first substrate; and
   (d) placing, after the execution of the steps (a) through (c), the second substrate on the first substrate and hardening the seal to join the first and second substrates together.

18. A method of manufacturing a liquid crystal light modulating device including a first substrate and a second substrate, at least one of which is flexible, a liquid crystal material filled between the first and second substrates and a seal surrounding said liquid crystal material to prevent said liquid crystal material from leaking, said method comprising the steps of:
   (a) providing the seal on at least one of the first and second substrates;
   (b) providing a resin structure on at least one of the first and second substrates to be located in a light modulating area, said resin structure being made of a material identical to that of the seal;
   (c) providing spacers on at least one of the first and second substrates;
   (d) dispensing the liquid crystal material on at least one of the first and second substrates; and
   (e) placing, after the execution of the steps (a) through (d), the second substrate on the first substrate and hardening the seal to join the first and second substrates together.

19. A method as claimed in claim 18, wherein the resin structure is provided on one of the first and second substrates, and wherein the seal is provided on the first or second substrate where the resin structure is provided.

20. A method as claimed in claim 18, wherein the resin structure and the seal are simultaneously provided on one of the first and second substrates.

21. A method as claimed in claim 20, wherein the process for providing the seal in the step (a) comprises a step of printing the material of the seal on at least one of the first and second substrates, and wherein the process for providing the resin structure in the step (b) comprises a step of printing the material of the resin structure on at least one of the first and second substrates.

22. A method as claimed in claim 18, wherein a process for providing the seal in the step (a) is equivalent to a process for providing the resin structure in the step (b).

23. A method of manufacturing a liquid crystal light modulating device including a first substrate and a second substrate, at least one of which is flexible, a liquid crystal material filled between the first and second substrates and a seal surrounding said liquid crystal material to prevent said liquid crystal material from leaking, said method comprising the steps of:
   (a) providing the seal on the second substrate;
   (b) providing a resin structure on the first substrate to be located in a light modulating area;
   (c) dispensing the liquid crystal material onto at least one of the first and second substrates; and
   (d) placing, after the execution of the steps (a) through (c), the second substrate onto the first substrate and hardening the seal to join the first and second substrates together.

24. A method as claimed in claim 23, wherein said resin structure is made of a thermoplastic resin material.

25. A method as claimed in claim 24, wherein a difference between a hardening temperature of the seal and a softening temperature of the resin structure is 15° C. or less.

26. A method as claimed in claim 24, wherein, in the step (c), the resin structure is softened while the seal is hardened by heat.

27. A method as claimed in claim 23, wherein the resin structure is made of a material different from a material of the seal.

28. A method as claimed in claim 23, further comprising the step of:
   (e) providing, before the step (d), spacers on at least one of the first and second substrates.

29. A method as claimed in claim 28, wherein said spacers are provided on the second substrate.

30. A method as claimed in claim 23, wherein said liquid crystal material is dispensed on the first substrate in the step (c).

31. A method of manufacturing a liquid crystal light modulating device including a first substrate and a second substrate, at least one of which is flexible, a liquid crystal material filled between the first and second substrates and a seal surrounding said liquid crystal material to prevent said liquid crystal material from leaking, said method comprising the steps of:

(a) providing the seal on at least one of the first and second substrates;

(b) providing a resin structure on the first substrate to be located in a light modulating area;

(c) providing spacers on the second substrate;

(d) dispensing the liquid crystal material onto at least one of the first and second substrates; and (e) placing, after the execution of the steps (a) through (d), the second substrate onto the first substrate and hardening the seal to join the first and second substrates together.

32. A method as claimed in claim 31, wherein said seal is provided on the second substrate in the step (a).

* * * * *